United States Patent
Götz

(10) Patent No.: US 10,014,611 B2
(45) Date of Patent: Jul. 3, 2018

(54) DEVICE AND METHOD FOR INTEGRATING AN ELECTRICAL ELEMENT INTO AN ELECTRICAL CIRCUIT UNDER LOAD

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/688,300

(22) Filed: Aug. 28, 2017

(65) Prior Publication Data
US 2018/0062291 A1 Mar. 1, 2018

(30) Foreign Application Priority Data
Aug. 30, 2016 (DE) .......... 10 2016 116 128

(51) Int. Cl.
| H01R 12/00 | (2006.01) |
| H01R 12/72 | (2011.01) |
| H01R 13/629 | (2006.01) |
| H01R 13/703 | (2006.01) |
| H02M 5/297 | (2006.01) |
| H02M 5/27 | (2006.01) |
| H02M 7/00 | (2006.01) |

(52) U.S. Cl.
CPC ........ H01R 12/721 (2013.01); H01R 13/629 (2013.01); H01R 13/7034 (2013.01); H02M 5/271 (2013.01); H02M 5/297 (2013.01); H02M 7/003 (2013.01)

(58) Field of Classification Search
CPC .............. H01R 12/721; H01R 13/7034; H01R 13/629; H01R 13/70; H02M 7/003; H02M 5/297; H01K 5/366
See application file for complete search history.

(56) References Cited

U.S. PATENT DOCUMENTS

| 5,286,215 | A | * | 2/1994 | Dewey ................ H01R 12/721 439/188 |
| 5,533,907 | A | * | 7/1996 | Kozel ................ H01R 13/7034 200/51.1 |
| 6,244,881 | B1 | | 6/2001 | Hara |
| 7,146,260 | B2 | | 12/2006 | Preston et al. |

(Continued)

FOREIGN PATENT DOCUMENTS

| CN | 104267217 A | 1/2015 |
| CN | 204129079 U | 1/2015 |

(Continued)

OTHER PUBLICATIONS

Ahmed et al., "Development of an Efficient Utility Interactive Combined Wind/Photovoltaic/Fuel Cell Power System with MPPT and DC Bus Voltage Regulation", Electric Power Systems Research, 2011, vol. 81, pp. 1096-1106.

(Continued)

*Primary Examiner* — Jean F Duverne
(74) *Attorney, Agent, or Firm* — RatnerPrestia

(57) ABSTRACT

A device and a method for integrating at least one electrical element into an electrical circuit during ongoing operation of the electrical circuit. In addition, a meta module for dynamic extension of an electrical circuit is possible to add any desired number of electrical elements.

12 Claims, 25 Drawing Sheets

(56) References Cited

U.S. PATENT DOCUMENTS

| | | | |
|---|---|---|---|
| 7,269,037 B2 | 9/2007 | Marquardt | |
| 7,972,143 B2* | 7/2011 | Smejtek | H05K 3/366 |
| | | | 439/61 |
| 8,461,856 B2* | 6/2013 | Ostmeier | G01R 15/14 |
| | | | 324/522 |
| 8,548,646 B1 | 10/2013 | Gariepy et al. | |
| 9,496,799 B2 | 11/2016 | Goetz et al. | |
| 2002/0036430 A1 | 3/2002 | Welches et al. | |
| 2012/0053754 A1 | 3/2012 | Pease et al. | |

FOREIGN PATENT DOCUMENTS

| | | |
|---|---|---|
| CN | 204360204 U | 5/2015 |
| DE | 10229170 A1 | 1/2004 |
| DE | 202006012687 U1 | 1/2008 |
| DE | 102010052934 | 5/2012 |
| DE | 102011108920 | 1/2013 |
| DE | 102014103420 A1 | 9/2015 |
| DE | 102014110410 A1 | 1/2016 |
| WO | 2013052043 A1 | 4/2013 |

OTHER PUBLICATIONS

Selvakumar et al., "A New Hybrid Cascaded H-Bridge Inverter for Photovoltaic-Wind Energy System", Proceedings of the Intl. Conf. on Innovative Trends in Electronics Communication and Applications 2014, pp. 130-140.

Parker, M.A., et al., "Distributed control of a fault-tolerant modular multilevel inverter for direct-drive wind turbine grid interfacing," Feb. 2013, pp. 509-522, vol. 60(2), IEEE Transactions on Industrial Electronics.

Goetz, S.M., et al., "Modular multilevel converter with series and parallel module connectivity: Topology and control," Jan. 2015, pp. 203-215, vol. 30(1), IEEE Transactions on Power Electronics.

German Search Report for German Application No. 10 2016 116 128.4, dated Aug. 4, 2017, including partial English translation, 10 pages.

* cited by examiner

DEVICE AND METHOD FOR INTEGRATING AN ELECTRICAL ELEMENT INTO AN ELECTRICAL CIRCUIT UNDER LOAD

CROSS-REFERENCE TO RELATED APPLICATIONS

This application claims priority to German Patent Application No. 102016116128.4, filed Aug. 30, 2016, the content of such application being incorporated by reference herein in its entirety.

FIELD OF THE INVENTION

The present invention relates to a device and to a method for integrating at least one electrical element into an electrical circuit during ongoing operation of the circuit. In addition, the present invention relates to a meta module which permits at least one further meta module or an electrical element also to be added during operation.

The present invention relates, in particular, to a device for integrating different electrical energy stores, energy sources and/or energy consumers which are not of the same type into an electrical circuit in such a way that the electrical circuit can be extended as desired during operation and at the same time act as an electrical converter or inverter with respect to one or more terminals or pairs of terminals.

BACKGROUND OF THE INVENTION

With the introduction of distributed energy generation systems, for example private photovoltaic solar power plants, wind turbine plants, hydroelectric power plants and combined heat and power plants, research is being increasingly carried out into integrating electrical energy stores in order to compensate technology-induced chronological fluctuations in the generation of energy by a large number of, in particular renewable, energy sources. A combination of a plurality of optionally distributed electrical energy sources, energy stores and/or energy consumers is often referred to here as a so-called micro grid.

In traditional concepts, different electrical energy sources, energy stores and/or energy consumers are usually integrated separately, with respectively separate power electronics, into one system. Each unit, comprising electrical energy sources, energy stores and/or energy consumers with different properties, requires separate power electronics here, composed of a converter or inverter, in order to adapt the electrical output variables, i.e. the current profile and voltage profile, to a common power grid, for example a common busbar. On the one hand, such systems are very expensive owing to the individually required converters or inverters which are adapted to a maximum power. In addition, they generate increased losses because each converter or inverter has to comply with the common electrical output parameters, for example 230 V AC or three-phase current and at the same time generally large voltage differences have to be bridged. Furthermore, they restrict the freedom of an operational regulator to reach an optimum operating point of the overall system, since common electrical output parameters generate peripheral conditions within which the varying of the operating point must remain, even if an overall optimum of the system were outside these conditions.

In particular, in the case of vehicles, according to traditional electrical drive systems with oscillating motors or three-phase motors, simple converters for generating approximately sinusoidal current profiles or voltage profiles are generally used for an electrical machine. These typically involve current-controlled or voltage-controlled two-point circuits. Current-controlled two-point circuits usually use bipolar components, here thyristors, in order to generate an amplitude for an electric machine by means of a phase angle control. Such circuits are also widespread in large-scale drives, for example in trains. Relatively new vehicles use voltage-controlled circuits virtually exclusively. However, there is generally very high distortion here in respect of current and voltage, which can cause interference in the respective electronic devices and aging of the driving components as well as oscillations and torque ripple. So-called multilevel converters can remedy this. Multilevel converters, for example neutral point clamped (NPC), flying capacitor, modular multilevel converters or MMSPC (Modular Multilevel Converter with Series and Parallel Module Connectivity) can generally generate only one alternating voltage or one three-phase voltage, for example for one or more drives. These supply voltages are generally in the high-voltage range above 60 V, typically above 200 V, and are usually fed from one or more high voltage accumulators. Respective outputs of the multilevel converters are not galvanically disconnected from one another and/or at least not from the at least one high voltage accumulator. However, electrical vehicles, ships, aircraft and the like generally have not only at least one voltage system, usually drive systems, but also further energy supply systems, usually low voltage supply systems. These may be, for example, a lighting system in order to deal with secondary assemblies, controllers or communication devices. For example, in contemporary vehicles there is usually at least one supply system with 12 V, 24 V, and/or 48 V DC voltage. 110 V or 230 V alternating voltage in the form of domestic sockets are also widespread, to a lesser degree.

Furthermore, in addition to multilevel converters, other power electronic systems and also batteries are also increasingly of modular design. However, it is generally not easily possible to expand or replace individual modules owing to hard wiring. In order to replace individual battery modules, for example a network access storage, the corresponding accumulator must be temporarily taken out of operation.

CN 204360204, which is incorporated by reference herein, describes a control unit for limiting the speed for a vehicle. The control unit is composed here of a microcontroller (MCU), connected to various modules, in particular for emergency alarms, steering control, windshield wipers, fog lights etc.

U.S. Pat. No. 7,146,260 B2, which is incorporated by reference herein, discloses a dynamically configurable multiprocessor system.

US 2012/0053754 A1, which is incorporated by reference herein, and WO 2013/052043 A1, which is incorporated by reference herein, disclose a design of an electrical communication and control module for use in a vehicle.

U.S. Pat. No. 8,548,646 B1, which is incorporated by reference herein, describes a distributed hardware architecture for a driverless vehicles.

CN 104267217 A, which is incorporated by reference herein, and CN 204129079 U, which is incorporated by reference herein, describe a design of a hot plug for use in an external area.

The integration of electrical energy sources, energy stores and/or energy consumers which are not of the same type into a single device is known from Selvakumar et al. [S. Selvakumar, P. Kulanthaivel (2014), which is incorporated by reference herein. A new hybrid cascaded h-bridge inverter for photovoltaic-wind energy system. Proceedings of the International Conference on Innovative Trends in Electronics Communication and Applications, 130-140.], which is incorporated by reference herein, Parker et al. [M. A. Parker, L. Ran, S. J. Finney (2013), which is incorporated by reference herein. Distributed control of a fault-tolerant modular multilevel inverter for direct-drive wind turbine grid interfacing. IEEE Transactions on Industrial Electronics, 60(2): 509-522.], which is incorporated by reference herein, Ahmed et al. [N. A. Ahmed, A. K. Al-Othman, M. R. AlRashidi (2011), which is incorporated by reference herein. Development of an efficient utility interactive combined wind/photovoltaic/fuel cell power system with MPPT and DC bus voltage regulation. Electric Power Systems Research, 81:1096-1106.], which is incorporated by reference herein, and US 20020036430, which is incorporated by reference herein, wherein the device itself can act as a converter or inverter. However, these known devices have the deficiency that they can only be expanded with difficulty. Either all the electrical energy sources, energy stores and/or energy consumers must already be connected for the initial putting into operation, or sufficient terminals must already be provided for further electrical energy sources, energy stores and/or energy consumers. Replacement of, for example, defective elements during ongoing operation is not provided here.

A function of a converter within the scope of the present disclosure denotes the capability of replacing energy between at least two connected electrical systems in such a way that different electrical properties of the two systems, composed of a time profile of current strength and voltage, are adapted to one another. For example, the voltage or the current flow is increased, reduced and/or inverted. In addition, adapting the electrical properties can also include a time profile and relate, for example, to conversion of direct voltage to alternating voltage/three-phase current or of alternating voltage/three-phase current to direct voltage. In addition, a converter function can include conversion of alternating voltages with different phase numbers and/or amplitudes and/or different frequency and/or different phase positions.

Inverters are often considered to be a subgroup of the converters which is distinguished by the fact that an alternating voltage is generated in contrast with that electrical system which is connected and which predominantly features as an energy consumer.

SUMMARY OF THE INVENTION

Against the background of the prior art, an object of the present invention has been to provide a possible way of dynamically expanding or reducing an electrical circuit during operation of the circuit by adding and removing individual electrical energy sources, energy stores and/or energy consumers.

In the text which follows, electrical energy stores, electrical energy sources and electrical energy consumers will generally be referred to as electrical elements.

In order to achieve the object, the present invention makes available a device for integrating at least one electrical element into an electrical circuit during ongoing operation of the electrical circuit. The electrical circuit comprises here at least two electrical modules which are connected to one another via at least one electrical connection. The at least one electrical connection is implemented by an electrical connecting line as part of the device according to aspects of the invention and corresponding terminals of the modules for the connecting line. The connecting line comprises two first electrical lines which each lead to one of the two modules and are electrically connected to one another at at least a first contact point by means of a spring mechanism. The spring mechanism is disconnected by completely inserting a plug as a further part of the device according to aspects of the invention, comprising at least two second electrical lines which form a line and contact pair, and an insulating material lying between the latter, in such a way that the electrical contact between the two first electrical lines is released, but a respective electrical contact is produced in each case at at least a second contact point between, in each case, one of the first electrical lines and one of the second electrical lines, wherein the plug is to be connected to the at least one electrical element to be integrated.

An electrical module comprises, within the scope of the present invention, at least one electrical element, i.e. an electrical energy store, an electrical energy source and/or an electrical energy consumer, and an optional electrical store such as, for example, a capacitor. Electrical parameters such as current and voltage are set by means of respective switches, for the electrical elements contained in the module as well as between terminals which are provided and to which further modules can be connected. Each module has at least two connections, also referred to as power connections, toward the outside.

Within the sense of the present invention, converters, multilevel converters and other power-electronic systems and also batteries which are of modular configuration are referred to as an electrical module. These include all modular rectifiers, in particular modular multilevel converters, also often referred to as multipoint converters. The MMSPC, described in Goetz, Peterchev, Weyh. Modular Multilevel Converter with Series and Parallel Module Connectivity: Topology and Control. IEEE Transactions on Power Electronics, which is incorporated by reference herein, 30(1): 203 et seq. is also constructed by means of electrical modules as described above. A further type of converter and module to which the electrical module according to the definition within the scope of the present invention also refers is described in DE 10 2014 110 410, which is incorporated by reference herein.

In a refinement of the device according to aspects of the invention, the plug is configured for a plurality of electrical connections between, in each case, one of the two modules and the electrical element to be integrated, and for this purpose has a corresponding multiplicity of electrical conductor and contact pairs, wherein respective partners of a respective conductor and contact pair are arranged opposite one another and are separated from one another by the at least one insulating material of the plug.

In a further refinement, the at least one electrical insulating material extends to intermediate spaces between the conductor and contact pairs, as a result of which the plug has at least one smooth surface. In this context, the electrical insulating material terminates flush with at least one of the partners of the conductor and contact pair toward the outside, with the result that the corresponding surface of the plug appears smooth. If the electrical insulating material is made to extend on both sides of the plug between the intermediate spaces of the conductor and contact pair or the plurality of conductor and contact pairs and also terminates flush toward the outside with the respective partners of a conductor and contact pair, the plug is smooth on both sides, i.e. the plug has a smooth surface on both sides.

As an alternative to this it is also conceivable for the at least one conductor and contact pair to lie countersunk with respect to the at least one piece of insulating material, and as a result corresponding grooves are formed on the surface of the plug. This means that the insulating material extends outward from the intermediate spaces between the conductor and contact pairs and as a result a groove structure is formed on the surface of the plug.

In a further refinement, a rounded portion is provided at one end of the at least one conductor and contact pair located in the direction of insertion of the plug, which rounded portion is configured in such a way that when the plug is inserted into the spring mechanism the two second lines of the at least one conductor and contact pair firstly each make electrical contact with in each case one of the two receiving first lines before the electrical contact between the two first lines is disconnected by further insertion of the plug.

Completely inserting the plug into the spring mechanism means that the plug is then in its provided end position in which the at least one line and contact pair which is arranged on the plug has the best provided electrical contact to the respective first electrical lines of the plug-in switching connection.

This means that electrical contacts of the plug firstly produce reliable electrical contact with respective associated contact points of the two first electrical lines before electrical contact which is present between the at least two first electrical lines until that point is interrupted.

This means that generally the insertion process or plug-in process of the plug into the spring mechanism provided according to aspects of the invention is divided into a plurality of phases. Firstly, a stable and bounce-free electrical connection is produced between the second electrical lines of the plug and the first electrical lines of the spring mechanism, while in parallel the electrical connecting line, i.e. the electrical contact between the at least two first electrical lines, remains closed.

The existing electrical contact, i.e. the electrical connecting line between the at least two first electrical lines at the first contact point is only opened subsequent to this, as a result of which a newly arising current path is released by the now single existing electrical connection between the respective first and second electrical lines.

The chronological sequence is important in this procedure so that it can be ensured that reliable electrical contact is always present between the modules and short-circuits or other distortions cannot occur.

The device according to aspects of the invention, also referred to below as a plug-in switching connection, in this case generally comprises the following elements:
  at least one contact part or a first contact point at which the electrical connecting line, i.e. the electrical connection between the two first electrical lines, is made available,
  at least one receptacle part which makes available at least one opening which is suitable for receiving the plug provided according to aspects of the invention when the plug is inserted into the spring mechanism as far as a first position without interrupting the electrical contact of the at least two first electrical lines at the first contact point,
  at least the spring mechanism which is specified according to aspects of the invention and which keeps the electrical contact closed between the at least two first electrical lines at the first contact point,
  at least one mechanical opening device which is operatively connected to the first contact point in such a way that when the plug is inserted further into the receptacle part beyond the first position the electrical contact of the first contact point is opened counter to a force of the spring mechanism.

The mechanical opening device is generally integrated into the receptacle part. However, in one particular refinement the mechanical opening device can also be embodied separately from the receptacle part.

In a further refinement it is conceivable for the plug to have cutouts running on one side or on both sides in the direction of insertion of the plug into the receptacle part or into the spring mechanism, on the respective surfaces of said plug.

Starting from an inserted state of the plug into the spring mechanism, in a further refinement of the device according to aspects of the invention it is conceivable that the two first lines of the at least one connecting line are lengthened in a direction pointing away from the two electrical modules and from the at least one second contact point and starting from the at least one second contact point they slowly extend away from one another in the direction of their respective ends in such a way that when the plug is pulled out of the spring mechanism contacts of the plug, i.e. of the at least two second lines at the at least one second contact point are electrically disconnected in each case from the two first lines only when the two first electrical lines of the at least one connecting line are in contact again at the at least one first contact point.

In addition, the present invention relates to a so-called meta module having at least one electrical module, having at least a first terminal, and having at least a second terminal and at least one connecting line connected to the second terminal, as part of a device as presented above which is implemented by means of two first electrical lines, wherein one of the two first electrical lines is connected to the electrical module and the other of the two first electrical lines leads to a third terminal, and wherein the two first electrical lines are electrically connected to one another at at least a first contact point by means of a spring mechanism, wherein the spring mechanism is disconnected by inserting a plug as a further part of the device described above, comprising at least two second electrical lines which form a line and contact pair, and an insulating material lying between the latter, in such a way that the electrical contact between the two first electrical lines is released, but a respective electrical contact is made available in each case at at least a second contact point between, in each case, one of the first electrical lines and one of the second electrical lines, wherein the plug is configured to be connected to a further electrical element and/or a further electrical module and/or a meta module.

The meta module provided according to aspects of the invention is distinguished by the fact that it comprises a traditional module and, in addition, at least a first terminal and at least a second terminal and a plug-in switching device as described above, which is connected to the second terminal.

The meta module according to aspects of the invention permits a further meta module to be added, even during operation. Therefore, a further expansion possibility arises with each expansion. The meta module according to aspects of the invention can also be generated for one or more than two connecting lines between two modules by correspondingly adding or removing connections and plug-in switching devices which are to be correspondingly provided. Therefore, a use of one or more meta modules according to aspects of the invention in an electrical circuit permits virtually any desired expandability. This is also the case, in particular, under load, i.e. even during ongoing operation of the electrical circuit.

It is also conceivable that a meta module has more than one expansion plug-in location for further modules or meta modules. Correspondingly, a plurality of plug-in switching devices as described above have to be provided.

The present invention also relates to a method for integrating at least one electrical module into an electrical circuit during ongoing operation of the electrical circuit, wherein the electrical circuit comprises at least two modules which are connected to one another via at least one electrical connection. The at least one electrical connection is implemented here by a connecting line of corresponding terminals of the modules for the connecting line. In this context, the connecting line comprises two first electrical lines which each lead to one of the two modules and are electrically connected to one another at at least a first contact point by means of a spring mechanism, wherein the spring mechanism is disconnected by inserting a plug, comprising at least two second electrical lines which form a line and contact pair, and an insulating material lying between the latter, in such a way that the electrical contact between the two first electrical lines is released, but a respective electrical contact is produced in each case at at least a second contact point between, in each case, one of the first electrical lines and one of the the second electrical lines, wherein the plug is connected to the at least one electrical element to be integrated.

A method for integrating at least one electrical element into an electrical circuit during ongoing operation of the electrical circuit is made available in which the electrical circuit comprises at least two modules which are connected to one another via at least one electrical connection, and in which a device, as described above, i.e. a plug-in switching device, is used.

BRIEF DESCRIPTION OF THE DRAWING FIGURES

Further advantages and refinements of the invention can be found in the description and the appended drawings.

Of course, the features mentioned above and the features which are still to be explained below can be used not only in the respectively specified combination but also in other combinations or alone without parting from the scope of the present invention.

The invention is illustrated schematically by means of the drawings and described schematically and in detail with reference to the drawings.

FIGS. 10a, 10b, 10c, and 10d show schematic illustrations of two modules with terminals which permit expansion by means of an additional module, according to aspects of the invention in which multiple connecting lines are illustrated with two modules from a chain disconnected and a third module connected therebetween (FIG. 10a), one connecting line is illustrated with the two modules from the chain connected and the third module is not yet connected (FIG. 10b), one connecting line is illustrated with the two modules connected and the third module also connected (FIG. 10c), and one connecting line is illustrated with the two modules disconnected and the third module connected therebetween.

Figure 11:
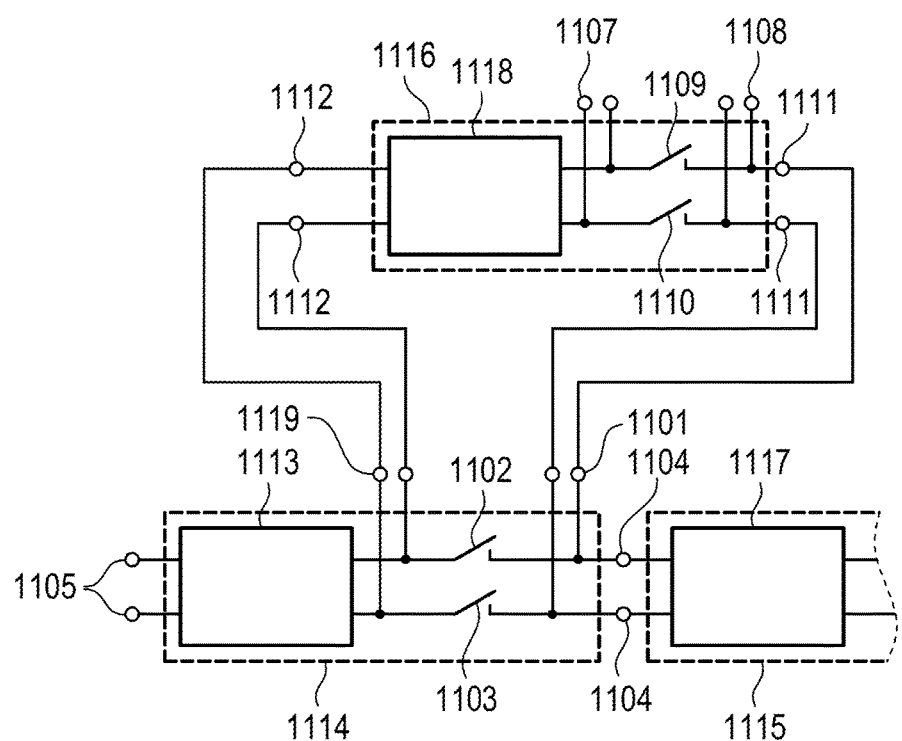

FIG. 11 shows a schematic illustration of an embodiment of the meta module provided according to aspects of the invention.

Figure 12A:
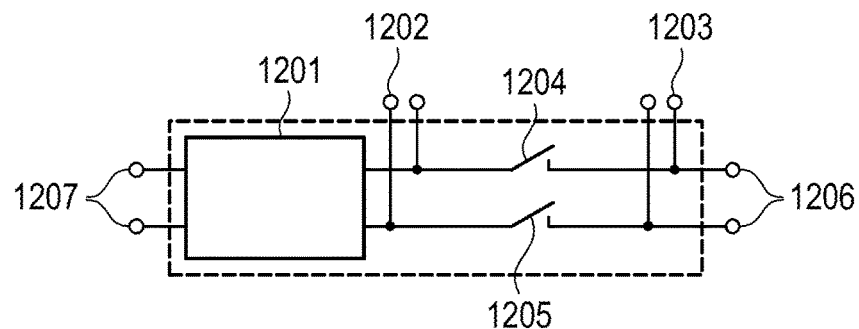
Figure 12B:
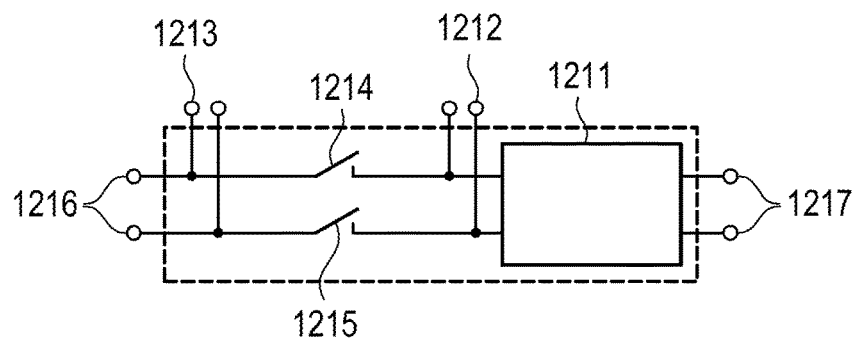
Figure 12C:
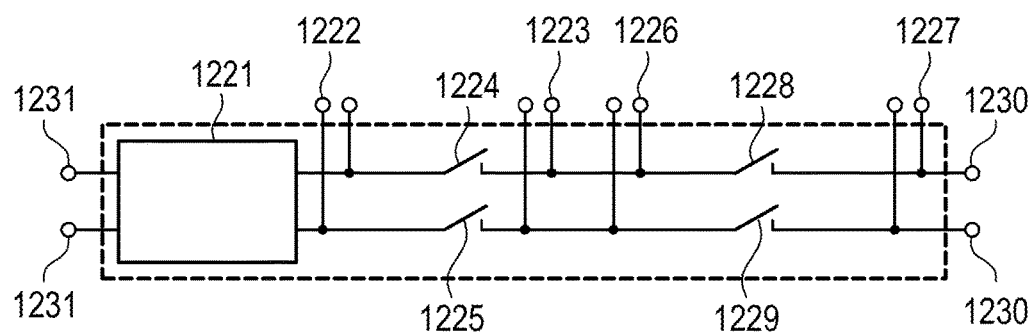

FIGS. 12a, 12b, and 12c show a schematic illustration of three examples of alternative arrangements of individual switches and electrical terminals in different embodiments of the meta module presented according to aspects of the invention.

Figure 13:
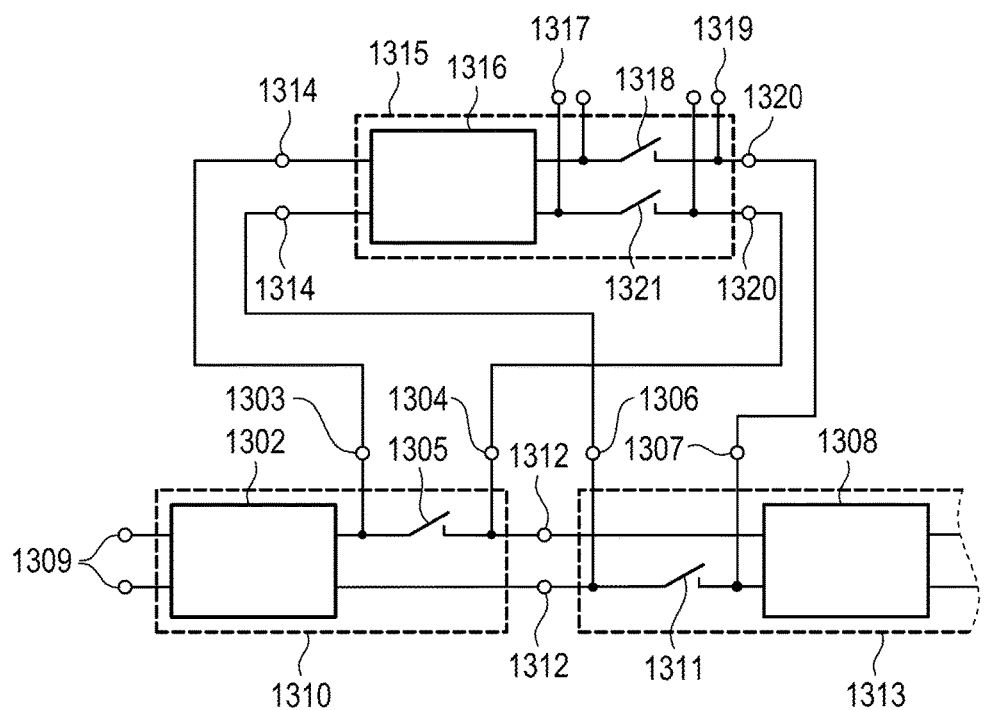
Figure 14A:
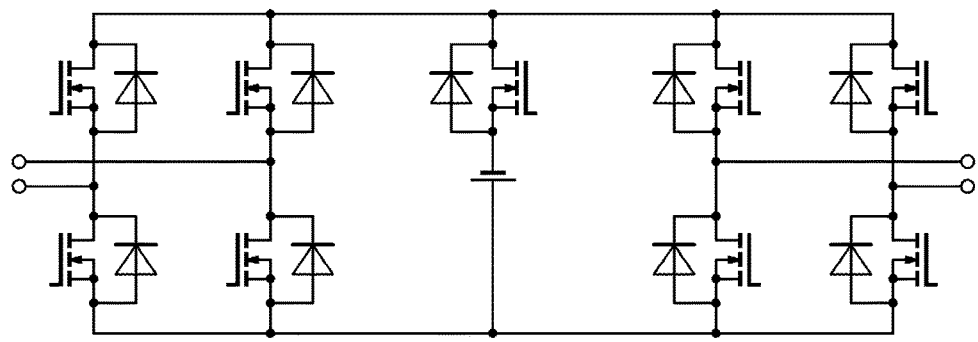
Figure 14B:
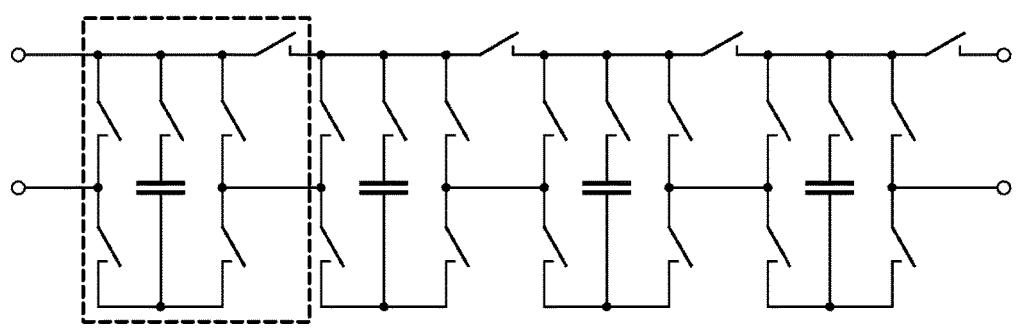
Figure 14C:
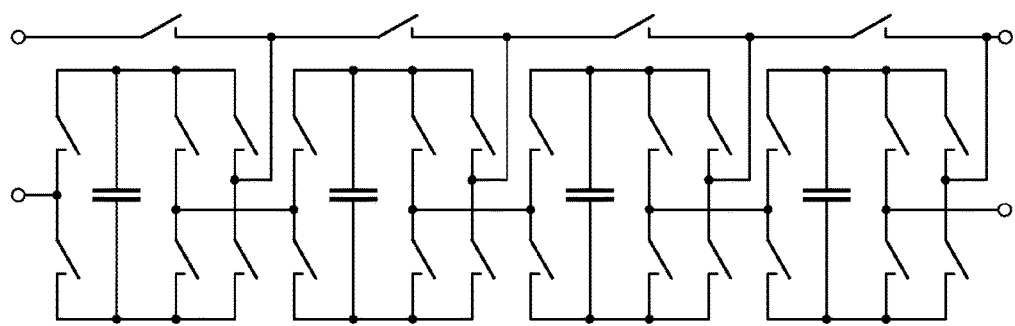
Figure 14D:
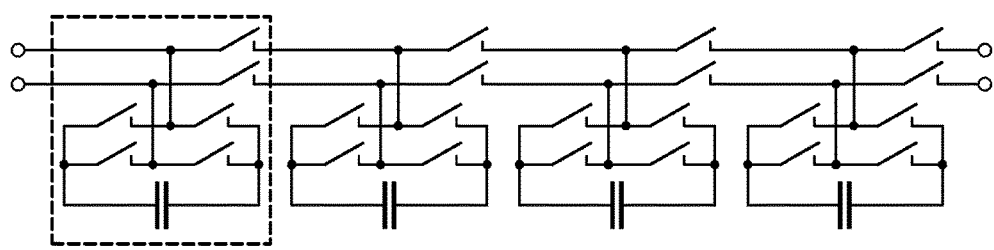
Figure 15A:
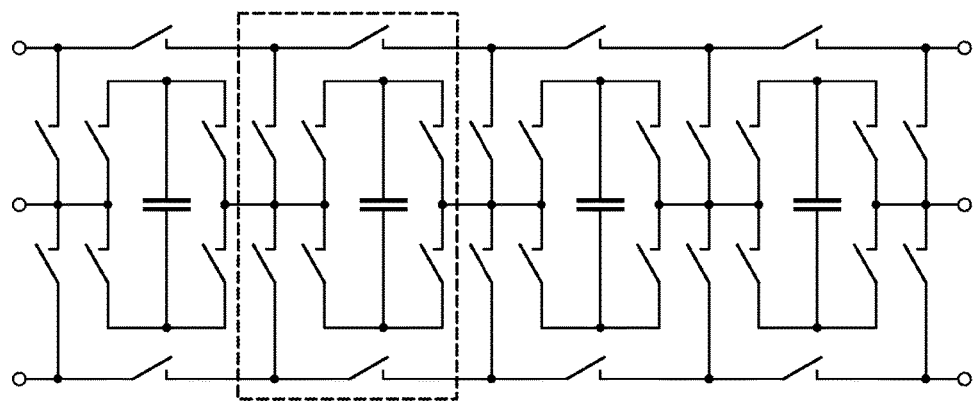
Figure 15B:
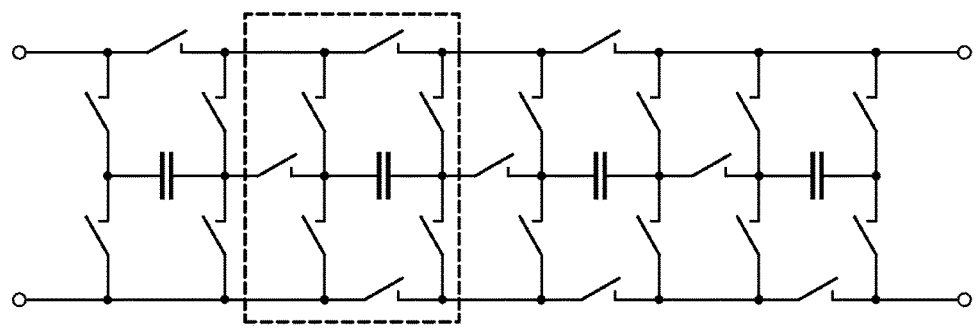
Figure 15C:
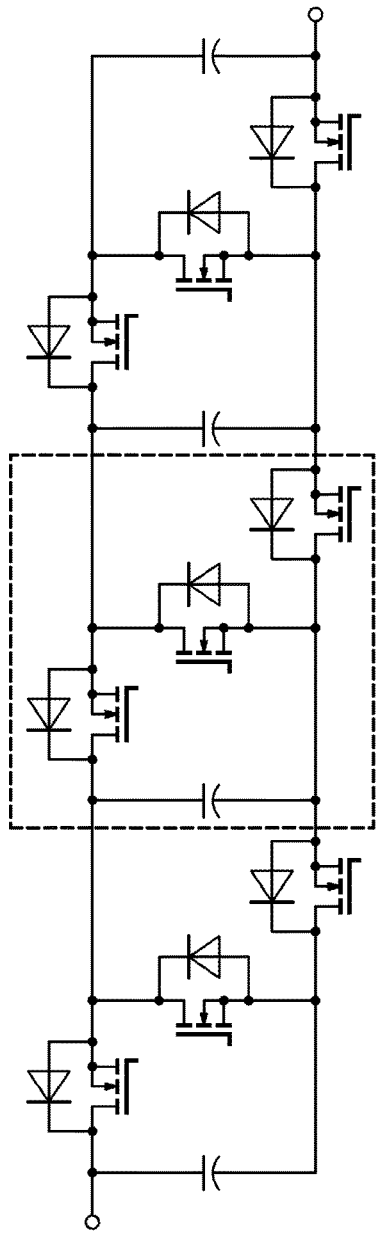
Figure 15D:
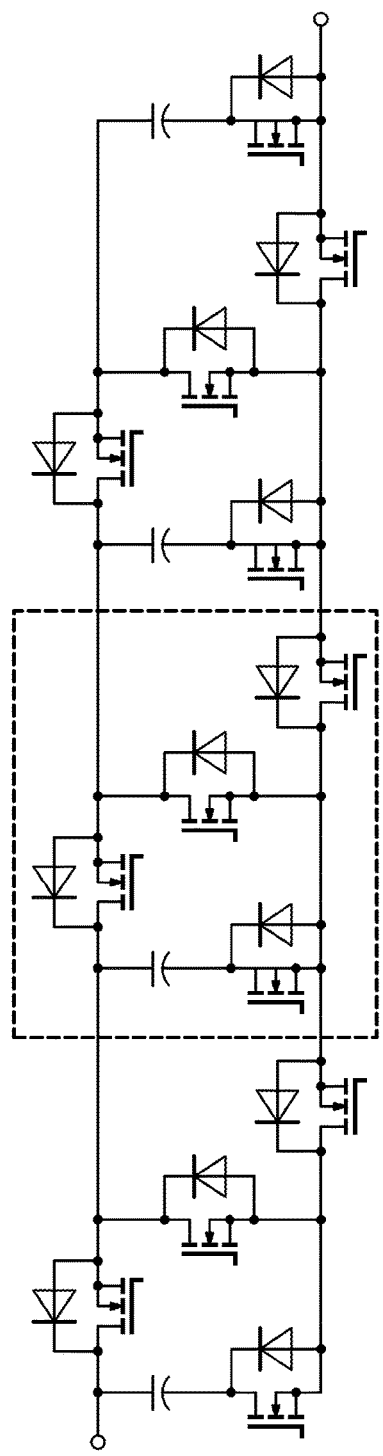

FIG. 13 shows an example of an alternative assignment of switches and electrical terminals to respective meta modules.

FIGS. 14a, 14b, 14c, and 14d each show examples of modules which can each be embodied as an embodiment of a meta module, according to aspects of the invention.

FIGS. 15a, 15b, 15c, and 15d each show examples of modules which can each be embodied as an embodiment of a meta module according to aspects of the invention.

Figure 16:
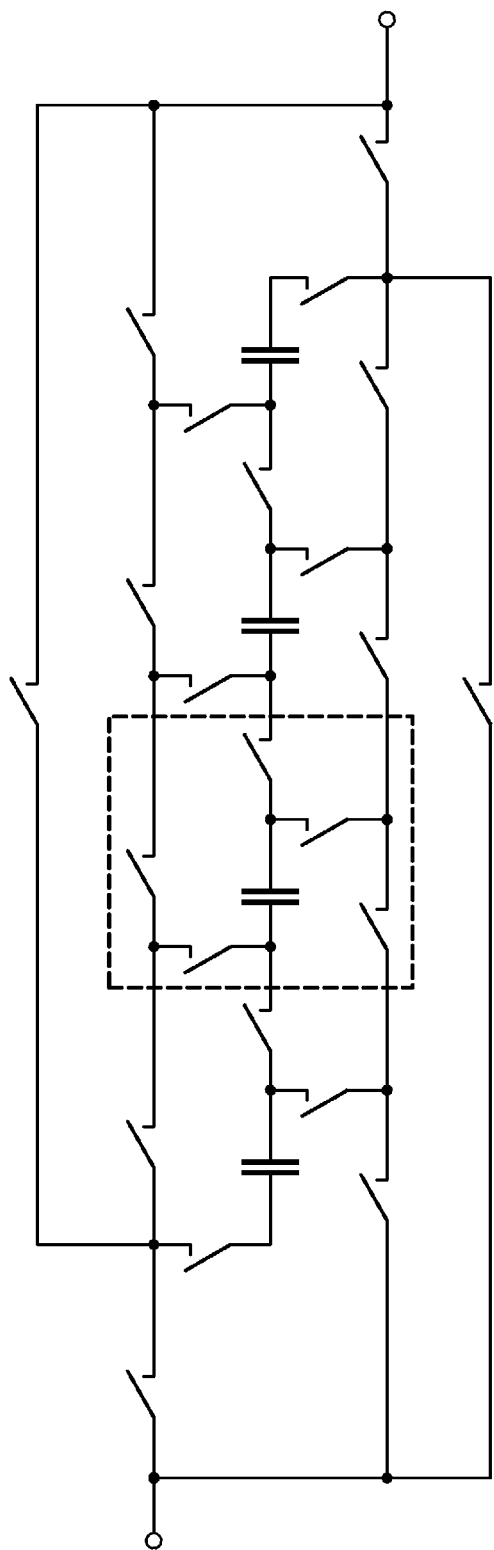
Figure 17A:
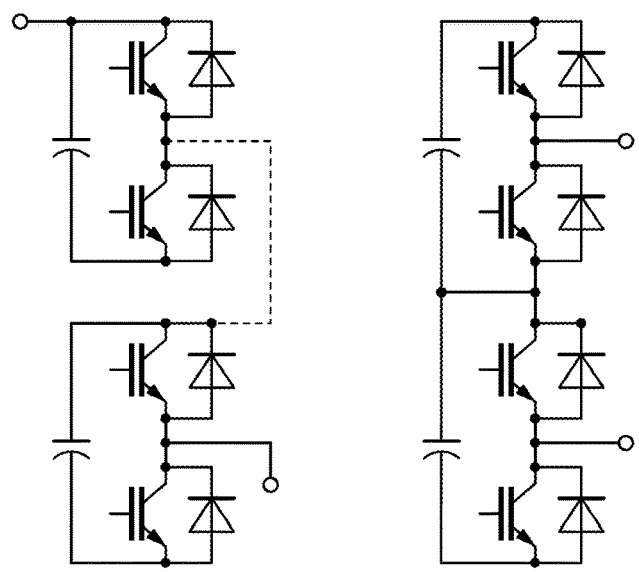
Figure 17B:
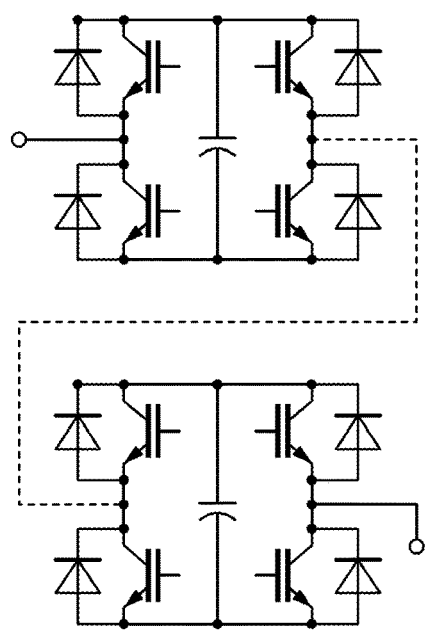
Figure 17C:
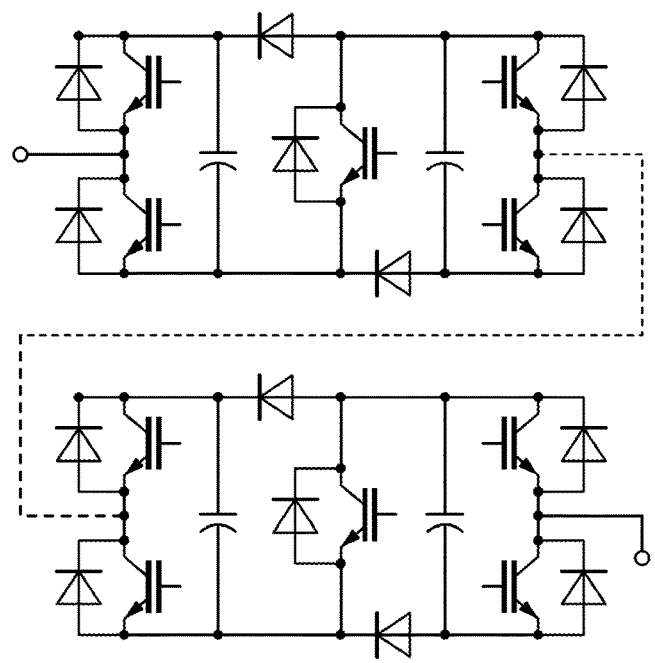
Figure 17D:
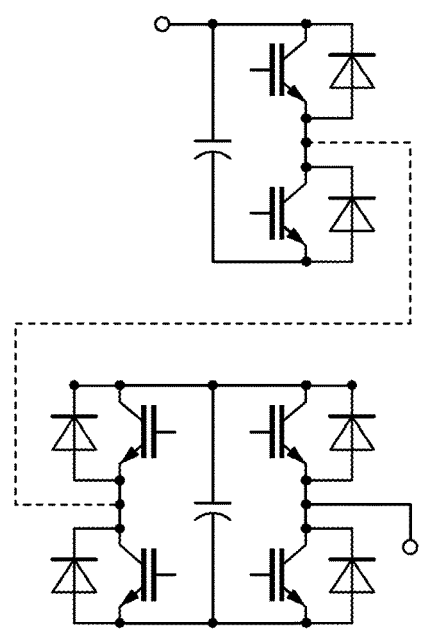
Figure 17E:
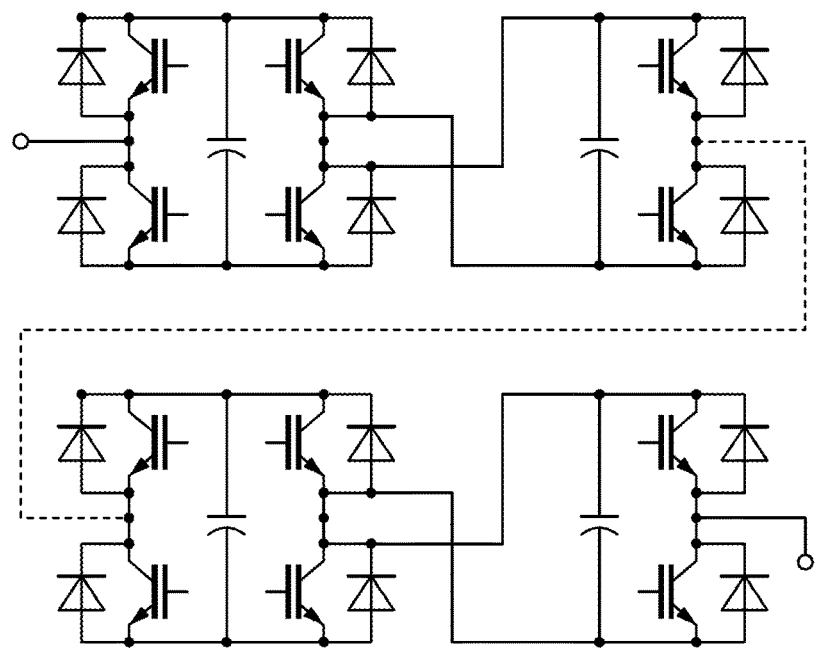
Figure 17F:
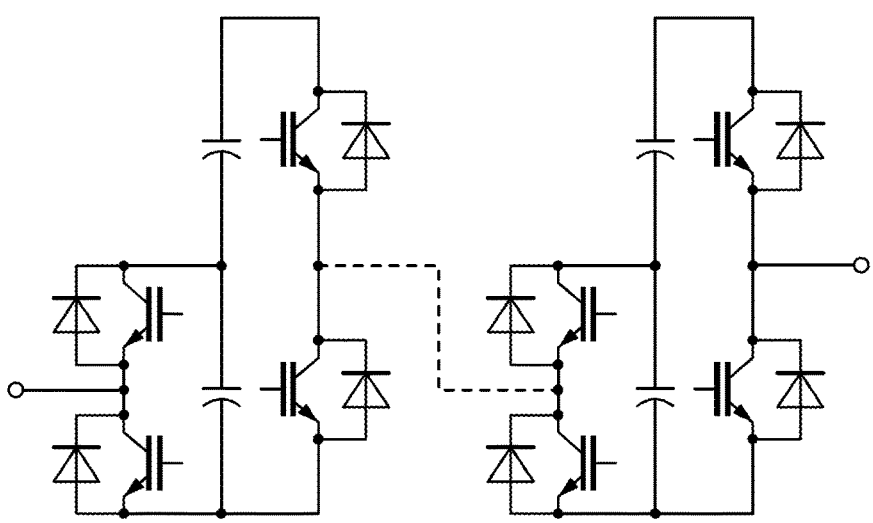
Figure 17G:
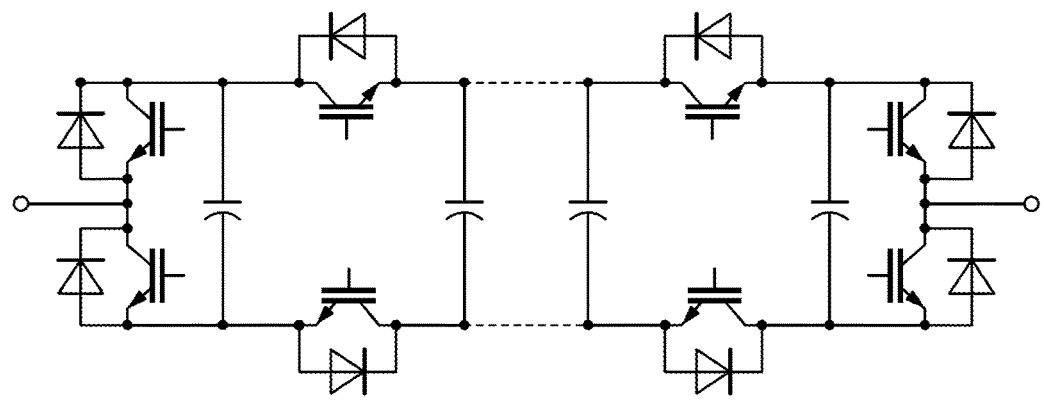
Figure 17H:
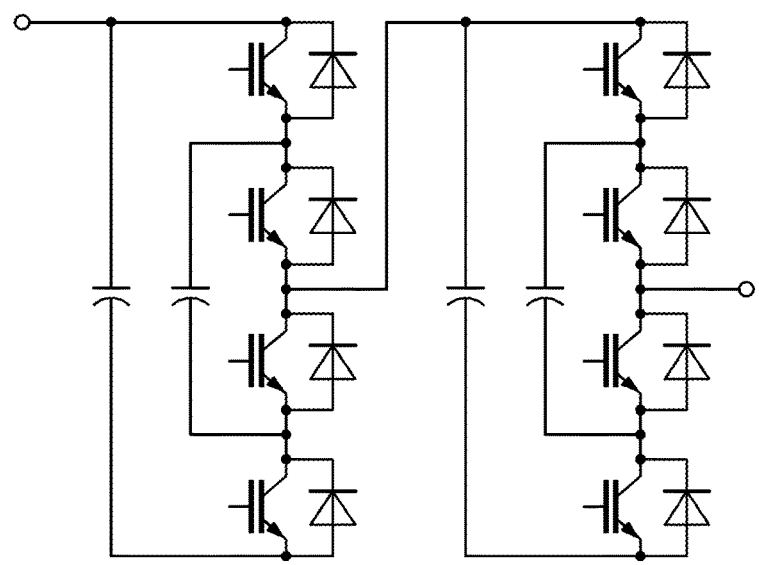
Figure 17I:
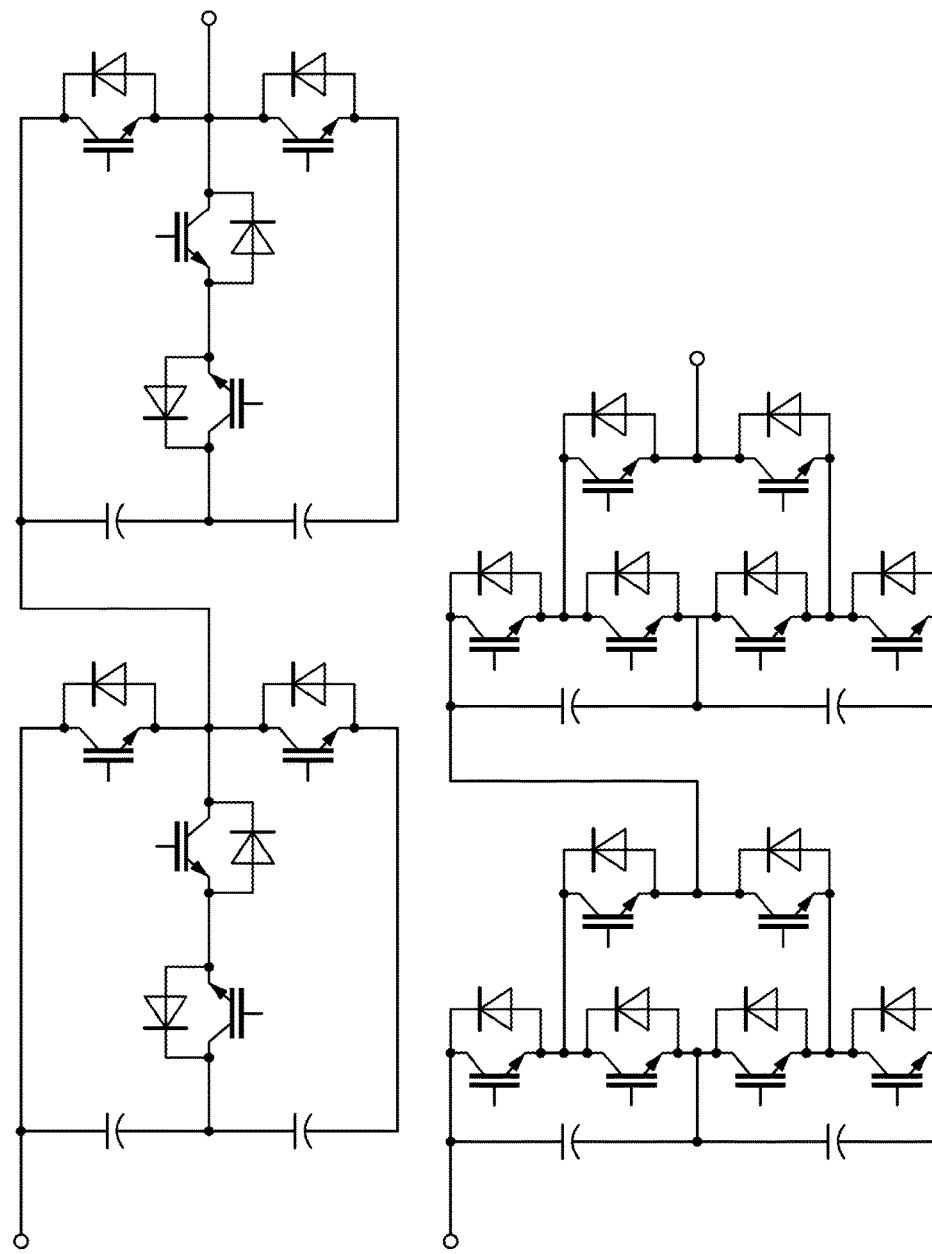
Figure 18A:
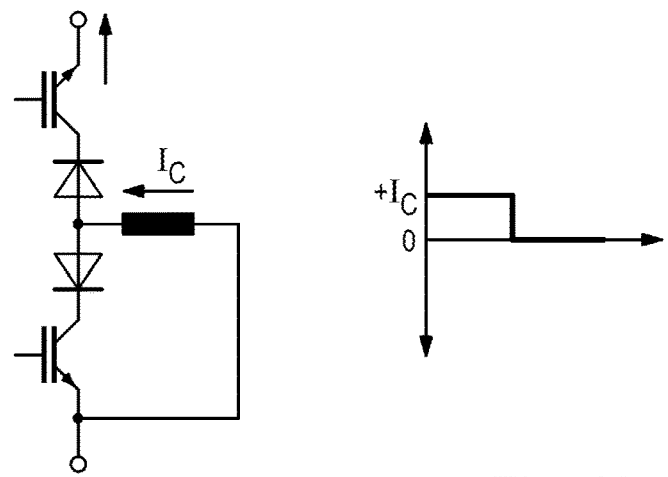
Figure 18B:
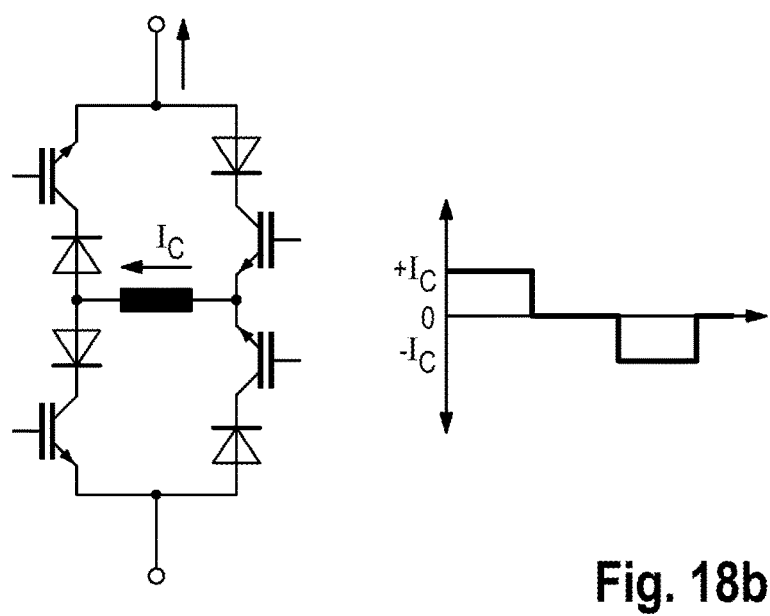
Figure 18C:
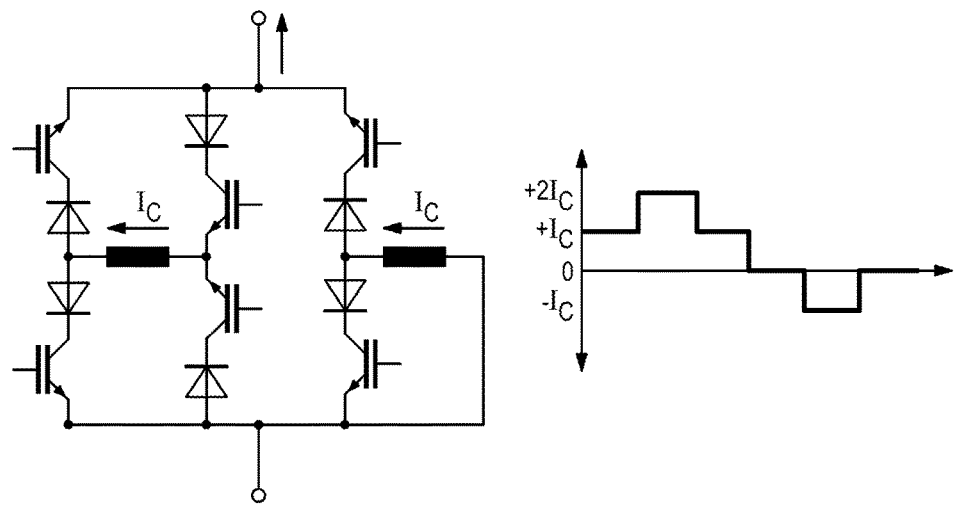
Figure 18D:
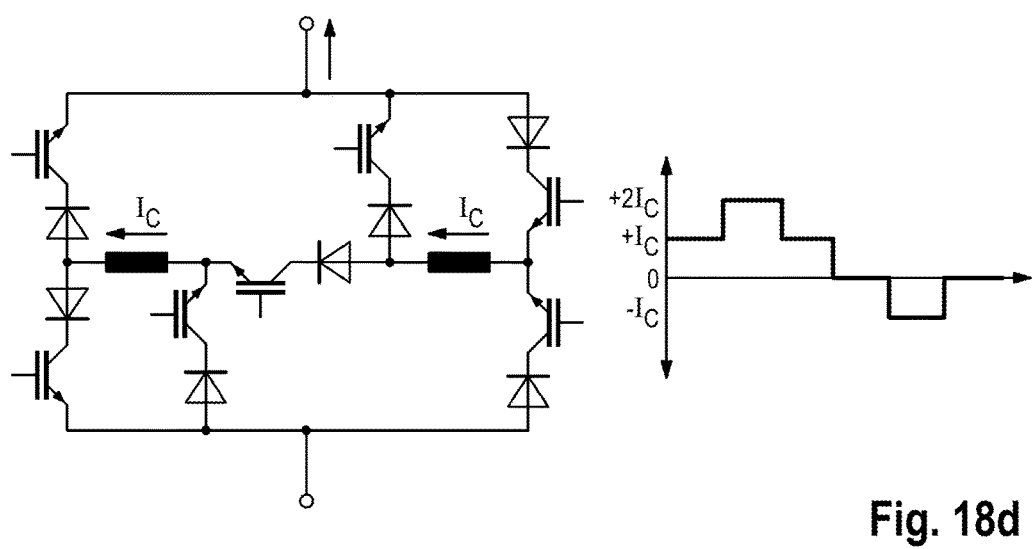
Figure 18E:
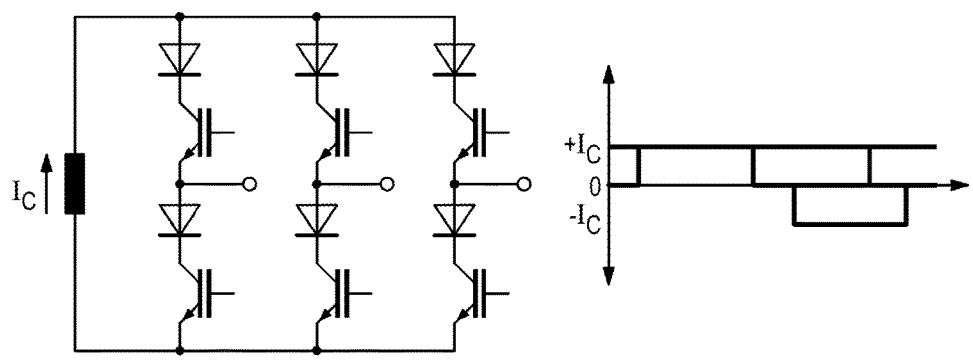

FIG. 16 shows examples of modules which can each be embodied as an embodiment of a meta module according to aspects of the invention.

FIGS. 17a, 17b, 17c, 17d, 17e, 17f, 17g, 17h, and 17i each show examples of modules which can each be embodied as an embodiment of a meta module according to aspects of the invention.

FIGS. 18a, 18b, 18c, 18d, and 18e each show examples of modules which can each be embodied as an embodiment of a meta module according to aspects of the invention.

DETAILED DESCRIPTION OF THE INVENTION

The figures are now described in a coherent and comprehensive fashion.

Figure 2:
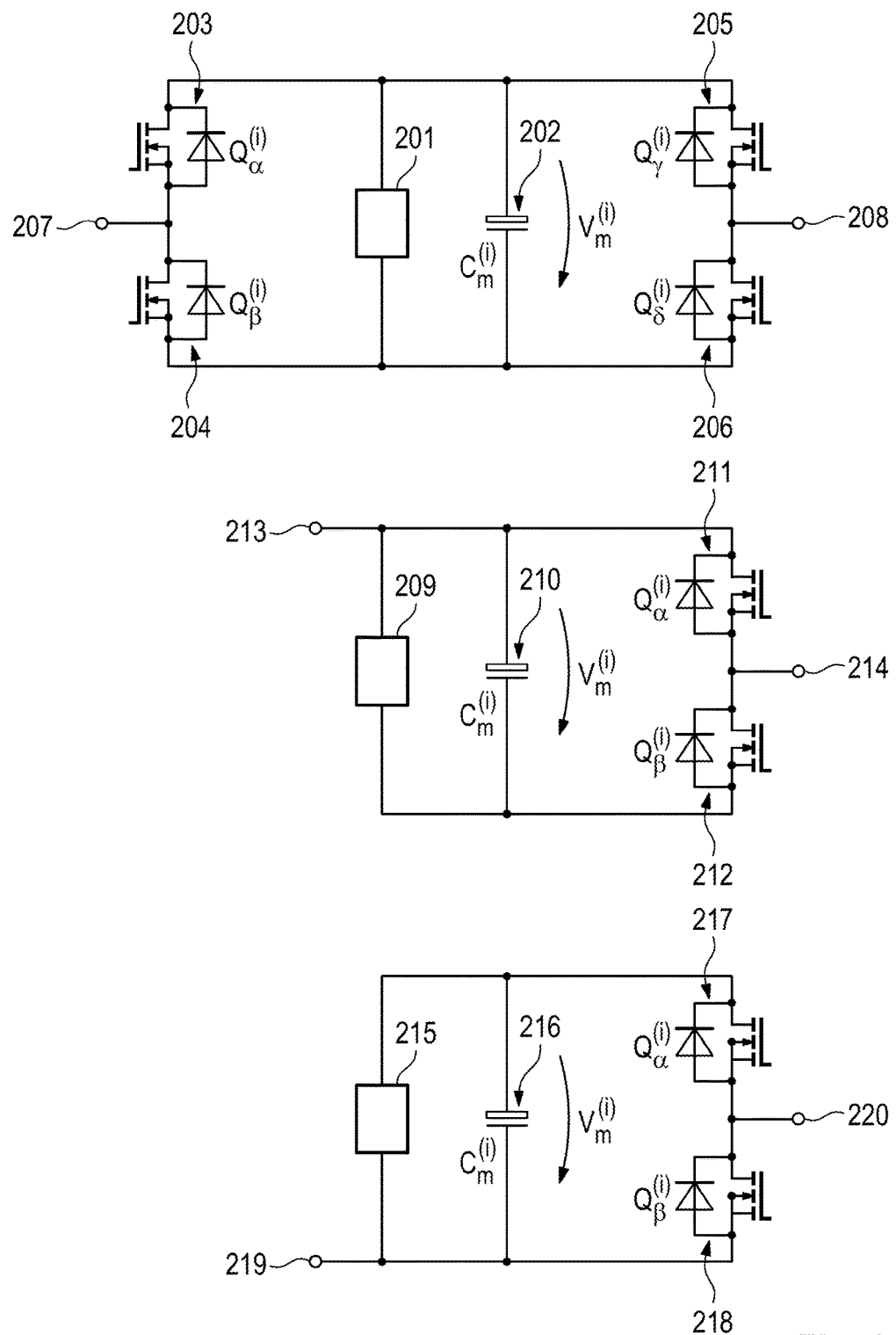
FIG. 2 shows three exemplary modules such are known from the prior art and such as can be provided in an electrical circuit.
Figure 3:
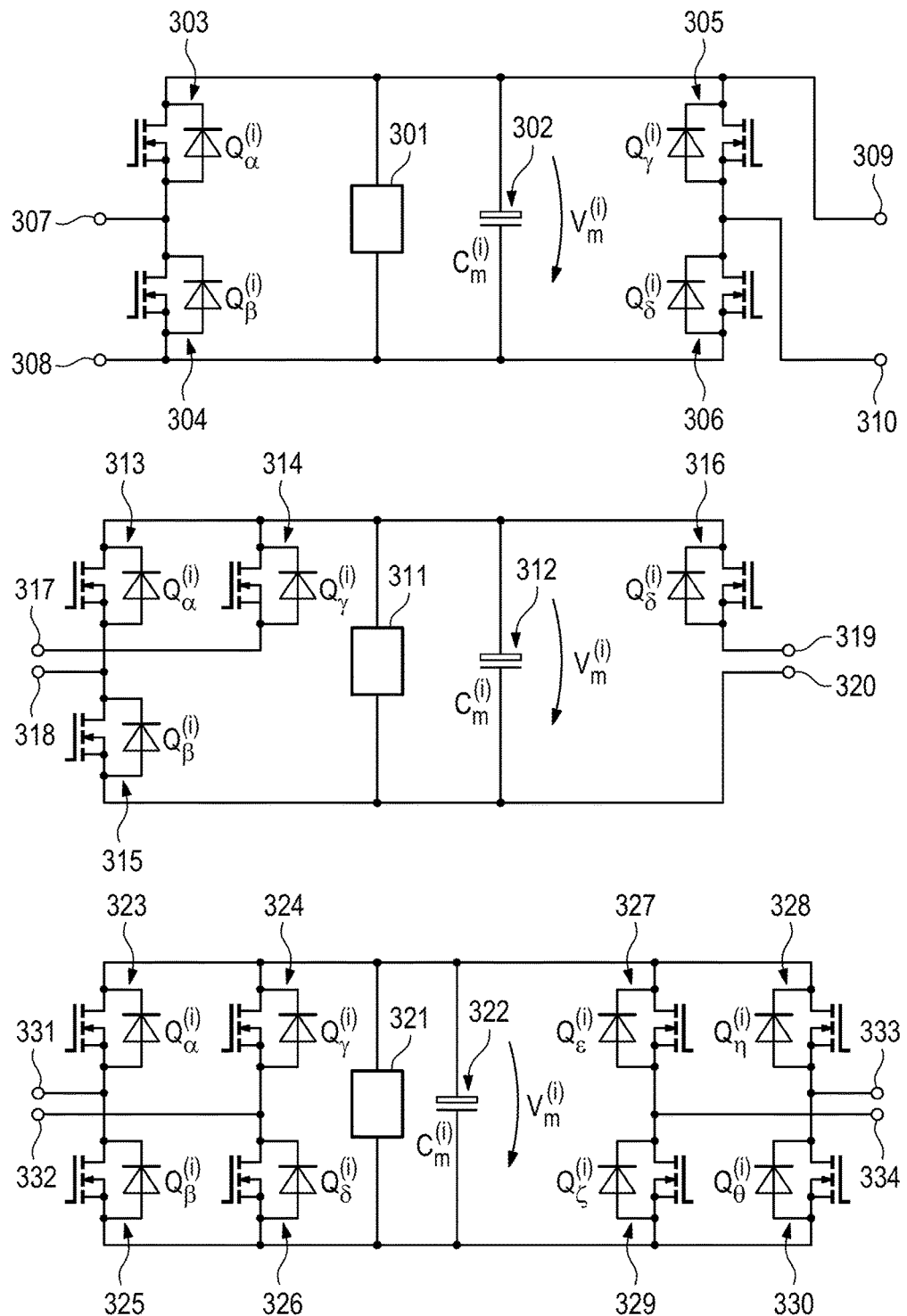
FIG. 3 shows three exemplary modules with an expanded functionality such as can likewise be integrated into an electrical circuit.

The present invention relates to the integration of individual modules into a common electrical circuit, for example in microgrids, such as is described in Selvakumar et al. [S. Selvakumar, P. Kulanthaivel (2014). A new hybrid cascaded h-bridge inverter for photovoltaic-wind energy system. Proceedings of the International Conference on Innovative Trends in Electronics Communication and Applications, 130-140.], Parker et al. [M. A. Parker, L. Ran, S. J. Finney (2013) Distributed control of a fault-tolerant modular multilevel inverter for direct-drive wind turbine grid interfacing. IEEE Transactions on Industrial Electronics, 60(2): 509-522.], Ahmed et al. [N. A. Ahmed, A. K. Al-Othman, M. R. AlRashidi (2011). Development of an efficient utility interactive combined wind/photovoltaic/fuel cell power system with MPPT and DC bus voltage regulation. Electric Power Systems Research, 81:1096-1106.] or US 20020036430, or into a so-called modular multilevel converter, as described, for example, in DE 10 2011 108 920, which is incorporated by reference herein, DE 10 2010 052 934, which is incorporated by reference herein, or U.S. Pat. No. 7,269,037, which is incorporated by reference herein,. In this electrical circuit, so-called modules, i.e. stand-alone power electronic units, as are shown, for example, in FIGS. 2 and 3, are connected with hard wiring to one another, with what is referred to as macrotopology. U.S. Pat. No. 7,269,037 shows, for example, such a macrotopology in FIG. 1. A plurality of adjacent modules are connected here largely in series. For example in FIG. 1 of U.S. Pat. No. 7,269,037 a plurality of modules are connected in series and combined to form so-called converter arms. Two converter arms connected in series result in a phase module. A plurality of phase modules when connected in parallel result in a Marquardt macrotopology. DE 10 2011 108 920 describes an analogous topology for modules in the parallel state.

Modules are preferably connected to one another in series. In order to insert a further module into a system, for example in order to expand a voltage working range or current working range or to keep available additional redundancy modules which, if individual modules fail, take over their function seamlessly without failure of the overall system, the series connection of two modules must be interrupted in order to insert the additional module. Because of the considerable currents, such an installation during operation is frequently not possible but instead requires deactivation of the system and manual installation.

In systems from the prior art, the modules are hardwired to one another and the wiring cannot be changed without time-consuming disassembly. Modules are generally connected to one another with screwed copper rails, more rarely also with cable connections, with screw terminals or plug connectors. However, simple expansion would be extremely desirable. For example, a currently very large commercial implementation of a modular multilevel converter by Marquardt in San Francisco and Pittsburgh keeps available a large number of equivalent modules in a circuit in order to be able to take over a very large assumed failure of modules up to a subsequent planned deactivation in a seamless fashion with equivalent modules. However, the equivalent modules impair the electrical properties of the overall system because the internal resistance and the parasitic inductance of respective converter arms are increased. In addition, the equivalent modules which are already fixedly integrated already give rise to increased costs when they are put into operation and are additionally subjected to accelerated aging during operation.

Accordingly, it would be more advantageous to integrate only a small number of equivalent modules in order to compensate a maximum assumed simultaneous failure of modules. A function of the failed modules can correspondingly be taken over in a seamless fashion by the installed equivalent module. In this case, there would have to be a possible way of adding further equivalent modules during operation, i.e. under load, in order also to be able to avoid further failures. At the same time, the defective modules could be removed in order to subject them, for example, to repair. However, until now no such possibility existed.

Despite the long research time, until now there was no adequate solution which came close to the present invention. Even the relatively high costs of maintenance deactivation in the case of relatively large implementations which are estimated to be system-relevant for network operation, and the even more urgent situation during the planned use of Marquardt's modular multilevel converters for converting generated energy in offshore wind farms, have not given rise to the present solution according to aspects of the invention.

Accordingly, in contemporary systems from the prior art, defective modules remain in respective systems and further modules cannot then be added if effective failures exceed the expected failures and a failure could arise. Instead, a maintenance interval has to be introduced, in which the respective system is powered down. In this context, high costs are generated and under certain circumstances the stability of an underlying electric power grid is put at risk. A further example is an expansion of a power plant grouping, for example a microgrid based on modules according to Selvakumar et al. [S. Selvakumar, P. Kulanthaivel (2014). A new hybrid cascaded h-bridge inverter for photovoltaic-wind energy system. Proceedings of the International Conference on Innovative Trends in Electronics Communication and Applications, 130-140.], Parker et al. [M. A. Parker, L. Ran, S. J. Finney (2013). Distributed control of a fault-tolerant modular multilevel inverter for direct-drive wind turbine grid interfacing. IEEE Transactions on Industrial Electronics, 60(2):509-522.], Ahmed et al. [N. A. Ahmed, A. K. Al-Othman, M. R. AlRashidi (2011). Development of an efficient utility interactive combined wind/photovoltaic/fuel cell power system with MPPT and DC bus voltage regulation. Electric Power Systems Research, 81:1096-1106.], which is incorporated by reference herein, or US 20020036430, which is incorporated by reference herein,.

The subject matter of the present invention overcomes this significant deficiency.

DETAILED DESCRIPTION OF THE INVENTION

Figure 1:
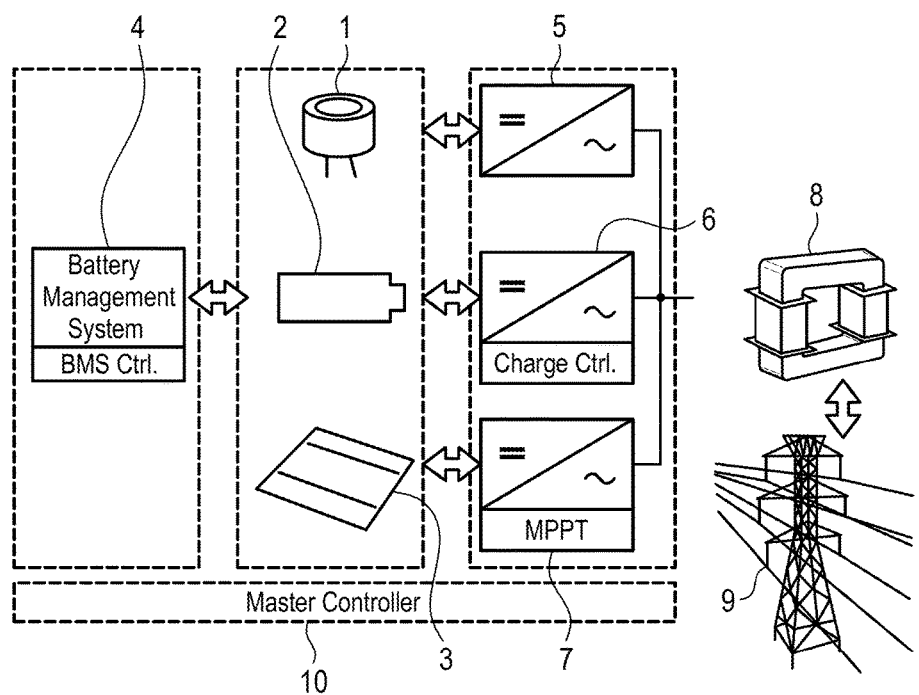
FIG. 1 shows an example of an integration solution of different electrical elements into an electrical circuit as is known from the prior art.

FIG. 1 shows an example of a traditional integration solution of different electrical elements, illustrated here as capacitors 1, batteries 2 and solar cells 3, which are each connected to a common power system 9 with their own converters or inverters 5, 6 and 7, if appropriate via a transformer or further converters or inverters 8, as is indicated by a double arrow. A number of electrical elements, for example battery packs 2, also require special functions which are usually not integrated in the respective converters or inverters, such as for example a battery management system 4. Each of the power electronic units 4 to 7 generally has a separate regulator and an independent optimizer with a different regulating objective. Under certain circumstances, a common regulator 10 is present which coordinates the individual regulators.

FIG. 2 shows three exemplary modules such as are already known from the prior art. Each of these modules comprises an electrical element 201, 209 and 215 and an optional electrical store such as, for example, a capacitor 202, 210 and 216. The respective modules set the electrical parameters of current and voltage both for the electrical elements and between respective terminals 207 and 208 or 213 and 214 or 219 and 220 by means of respective switches 203-206, 211, 212, and 217 and 218. Further modules can be connected to the specified terminals. Each of the modules shown here has in this context two power connections or terminals toward the outside.

FIG. 3 shows three exemplary modules with in each case an expanded functionality compared to the modules from FIG. 2. Each module comprises here in turn in each case an electrical element 301, 311 and 321 and an optional electrical store such as, for example, a capacitor 302, 312 and 322. Each of the modules in turn sets electrical parameters such as current and voltage both for the electrical elements and between the terminals 307-310 and 317-320 and 331-334, to which further modules can be connected, by means of switches 303-306 and 313-316 and 323-330. Each module has in this context at least four power connections toward the outside.

Figure 4:
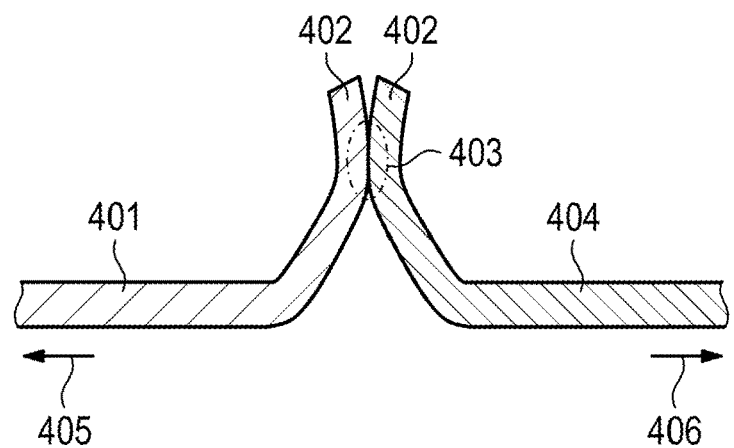
FIG. 4 shows a schematic illustration of an embodiment of a device according to aspects of the invention.

FIG. 4 shows an embodiment of a device according to aspects of the invention, also referred to as a plug-in switching device below, in a non-expanded state. Two first electrical lines are shown as part of a connecting line which is configured to connect two modules electrically to one another. The two illustrated first electrical lines 401 and 404 accordingly each lead to modules 405 and 406 to be correspondingly connected, as illustrated by respective arrows. The two first electrical lines 401 and 404 are electrically connected to one another at at least a first contact point 403 by means of a spring mechanism 402.

Figure 5:
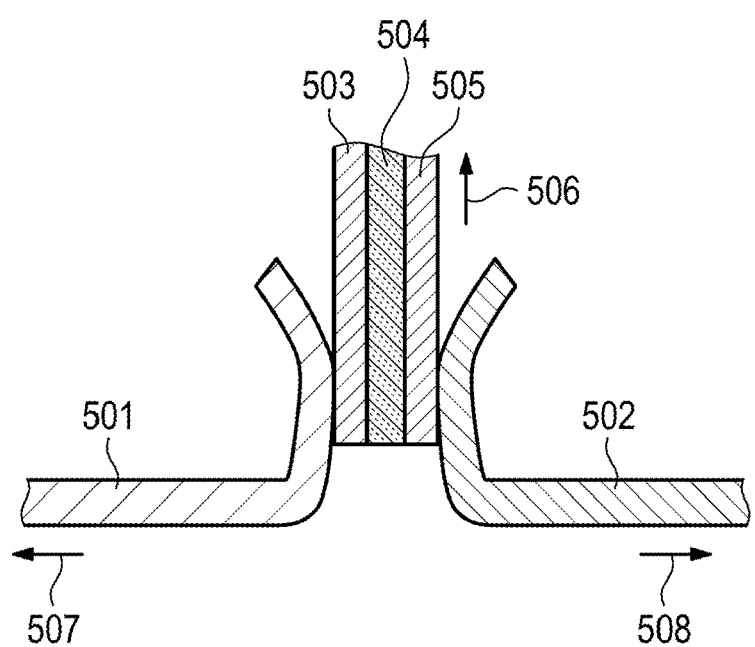
FIG. 5 shows an embodiment of the device according to aspects of the invention similar to that from FIG. 4 with a module connected thereto.

FIG. 5 shows an embodiment of the plug-in switching device according to aspects of the invention, similar to that in FIG. 4, in a state in which a further module is connected. The spring mechanism of the automatic plug-in switching device is disconnected by inserting a plug, comprising at least two second electrical lines 503 and 505 which form a line and contact pair, and an insulating material 504 lying between the latter, in such a way that no electrical contact is present anymore between the first electrical lines 501 and 502 at the first contact point 403 but instead electrical contact is implemented between the electrical lines 503 and 501 and between the electrical lines 505 and 502 at, in each case, at least one second contact point. Correspondingly, an additional module 506, which is intended to expand the previous system, can be connected to the plug. The additional module is indicated here in turn by arrow 506, and the modules 507 and 508 which are already connected are indicated by respective arrows.

Figure 6A:
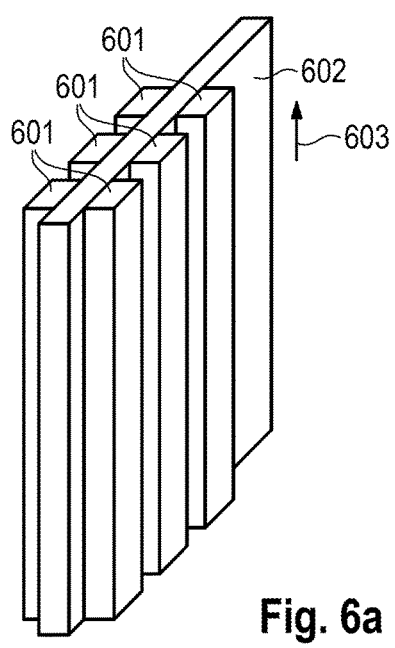
FIGS. 6a and 6b show a lower part of an exemplary plug such as can be used in an embodiment of the device with insulating material not present in intermediate spaces (FIG. 6a) and present in intermediate spaces (FIG. 6b), according to aspects of the invention.
Figure 6B:
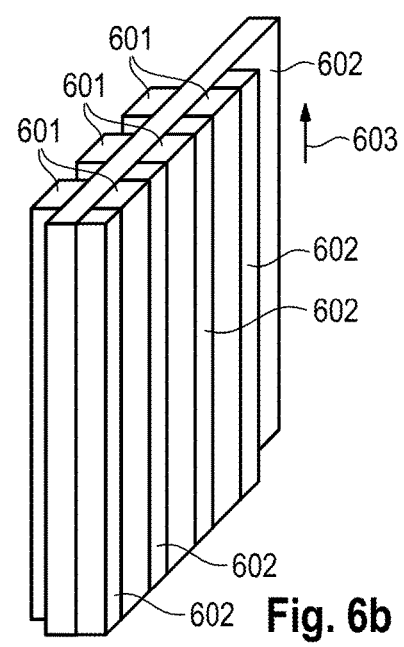

FIGS. 6a and 6b shows a lower part of an embodiment of a plug such as can be used in the inventive device described above, in particular in the embodiments of the inventive device described in FIGS. 4 and 5. The plug illustrated here is configured for three electrical connections between, in each case, two modules. Correspondingly, three conductor and contact pairs 601 are present arranged opposite one another and separated by an electrical insulating material 602 (FIG. 6a). Alternatively, the electrical insulating material 602 can be expanded to intermediate spaces between the conductor and contact pairs 601 in such a way that the plug forms, at least on one side, a smooth surface (FIG. 6b), preferably forming smooth surfaces on both sides. As a result, if appropriate, insertion of the plug into the spring mechanism (not illustrated here) of the device according to aspects of the invention can be facilitated. In addition, the conductor and contact pairs 601 can be countersunk so that they are at a deeper position with respect to the insulating material 602 and as a result form grooves which are beneficial to a plug-in process and to straight insertion of the plug into a corresponding mating piece.

Figure 7:
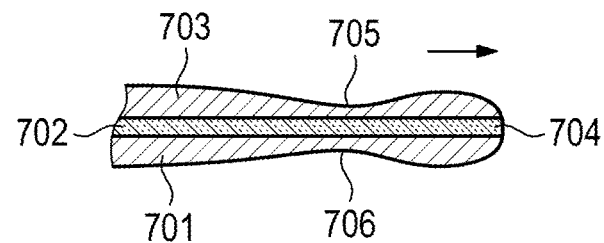
FIG. 7 shows a further embodiment of an exemplary plug such as can be used in an embodiment of the device according to aspects of the invention.

FIG. 7 shows a further embodiment of an exemplary plug such as can be used for the respective embodiment of the device according to aspects of the invention from FIGS. 4 and 5. One or more electrical conductor and contact pairs 701, 703 are arranged on an electrical insulation material 702, wherein in each case a partner of a respective conductor and contact pair is arranged lying opposite the respective other partner of the corresponding conductor and contact pair and separated by the insulating material 702. A rounded portion 704 at a front end, in the insertion direction, of the respective conductor and contact pair 701, 703 can be configured in such a way that the conductor and contact pairs 701, 703 firstly make electrical contact with the receiving electrically conductive spring mechanism 402 (not illustrated here) from FIG. 4, before electrical contact between the two first electrical lines 401 and 404 is disconnected by further insertion of the plug into the spring mechanism 402. The rounded portion 404 at the same time simplifies insertion into the spring mechanism 402 here. Additionally provided depressions 705 and 706 on one side or on both sides can, in the completely inserted, i.e. in the plugged, state, increase a respective electrical contact area between the conductor and contact pairs 703, 701, each arranged on the plug, with respect to the two first lines 401 and 404 and improve a secure hold by increasing a corresponding holding force and therefore undesired slipping out from the spring mechanism 402 or a fitting or a receptacle part of the spring mechanism is made more difficult.

Figure 8:
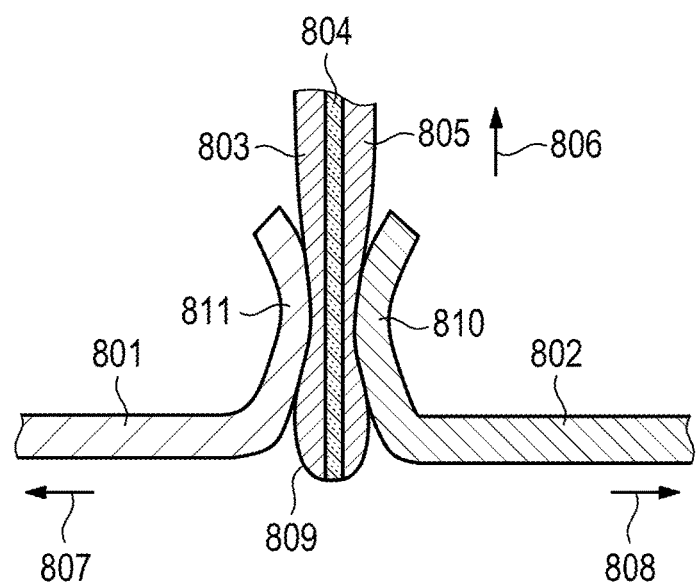
FIG. 8 shows a further embodiment of an exemplary plug for an embodiment of the device according to aspects of the invention.

FIG. 8 shows a further embodiment of an exemplary plug similar to that from FIG. 7 for the embodiment of the inventive plug-in switching device, respectively illustrated schematically in FIGS. 4 and 5, in a completely inserted, i.e. plugged, state. The depressions 705 and 706 from FIG. 7 correspond here approximately to the mating piece of inner contact areas of the spring mechanism 810 and 811, as a result of which the respective contact areas on both sides of the plug are increased significantly and a holding force which makes undesired slipping out of the plug from the spring mechanism 810, 811 or the fitting more difficult.

Figure 9:
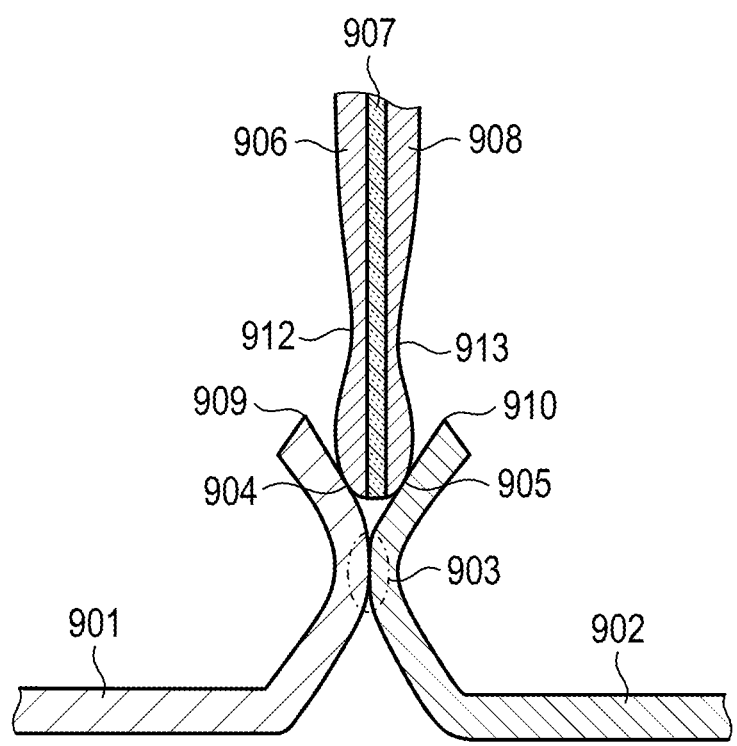
FIG. 9 shows the embodiment of an exemplary plug from FIG. 7 when the plug is introduced into a spring mechanism which is also illustrated and is provided according to aspects of the invention.

FIG. 9 shows yet another embodiment of an exemplary plug similar to that from FIG. 7 for the embodiment, respectively illustrated schematically in FIGS. 4 and 5, of the inventive plug-in switching device when insertion is occurring, when the one or more electrical conductor and contact pairs 906, 908 which are separated from one another by an insulating material 907 bring about electrical contact with the first electrical lines 901, 902. This first implementation of contact is indicated by the contact points 904 and 905. In this state, a contact of the two first lines 901, 902 with one another at the first contact point 903 is, however, not yet disconnected. Disconnection of the electrical contact at the first contact point 903 only occurs as a result of further insertion of the plug which, with an optionally round tip and with cutouts 912, 913 on both sides, facilitates the insertion mechanism. The plug is removed from the fitting or the spring mechanism in an analogous reverse sequence. Upper ends 909, 910 of the spring mechanism or of the two first electrical lines 901, 902 can be lengthened here further and extend slowly away from one another in the direction of their ends, in order to permit a sliding process which is as long as possible and to ensure that even when the plug is pulled out rapidly from the spring mechanism or the fitting, the contacts 906, 908 of the plug are not electrically disconnected from the contacts of the fitting 909, 910 or the spring mechanism before the two first electrical lines 901 and 902 make contact again at the first contact point 903. The latter can prevent the formation of arcs or brief interruptions during operation.

Figure 10A:
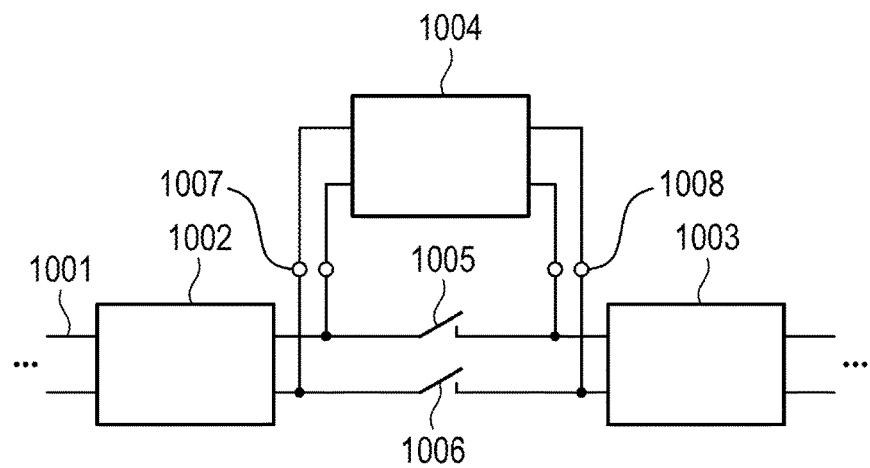

FIG. 10a shows two modules 1002 and 1003, for example from a chain, which permit expansion by an additional module 1004 by means of suitable switches 1005 and 1006 and terminals 1007 and 1008. This expansion can take place during operation. The switches 1005 and 1006 and the associated terminals 1007 and 1008 can be embodied, for example, by means of an embodiment of the automatic plug-in switching device presented according to aspects of the invention, as is shown, for example, in FIGS. 4 and 5. However, such an expansion is limited to the number of terminals 1007, 1008 and switches 1005, 1006 which are already present during the putting into operation and which permit the addition of further modules. FIG. 10*a* is illustrated for, in each case, two electrical connecting lines 1001, in pairs, between two modules such as are required, for example, for the modules from FIG. 3. However, analogously, equivalent solutions for merely one connecting line, as, for example, for the modules in FIG. 2, or more than two connecting lines between two modules can also be implemented by omitting and adding terminals 1007, 1008 and switches 1005, 1006.

Figure 10B:
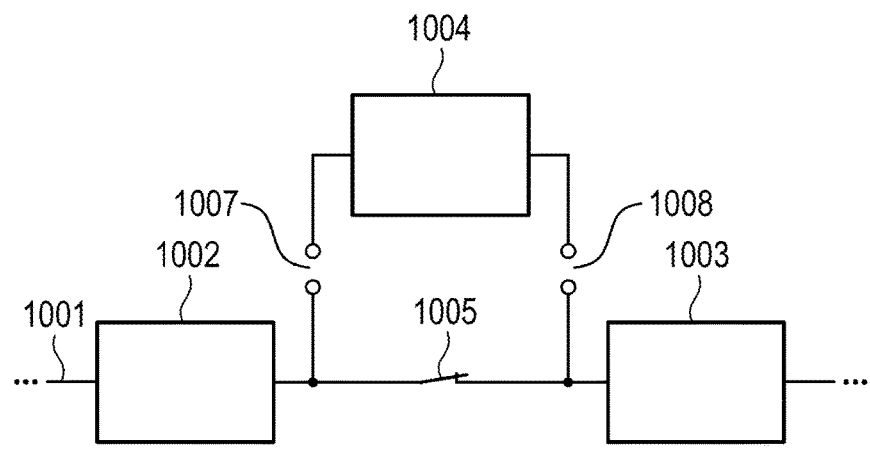
Figure 10C:
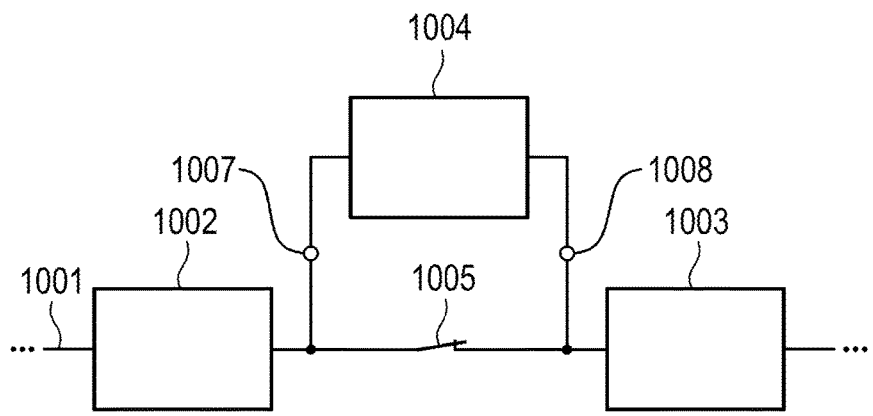
Figure 10D:
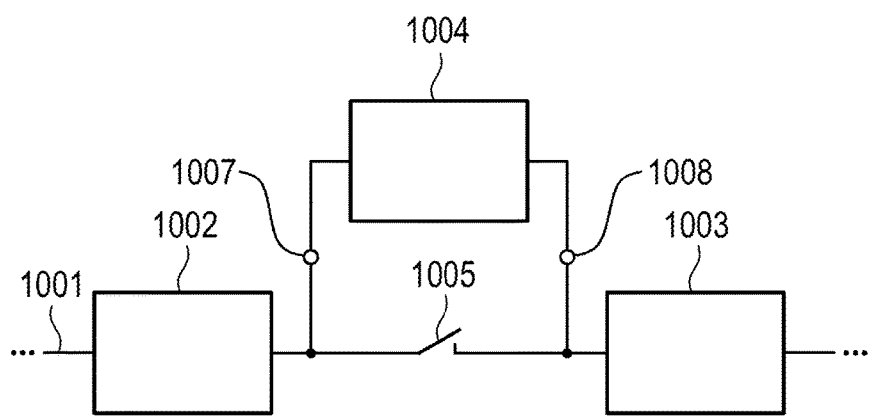

FIGS. 10*b*, 10*c* and 10*d* show a switching sequence using the example of an MMC. In FIG. 10*b*, the module 1004 is still disconnected from the modules 1002 and 1003. In FIG. 10*c* an intermediate state is illustrated in which although the module 1004 is already connected to the terminals 1007 and 1008 of the modules 1002 and 1003, respectively, at the same time the switch 1005 is also still closed so that the modules 1002 and 1003 are also still electrically connected to one another. As is shown in FIG. 10*d*, the contacts or the electrical connection between the modules 1002 and 1003 is not disconnected, by opening switch 1005, until the module 1004 has respectively established a stable electrical connection to the modules 1002 and 1003 via the terminals 1007 and 1008. In the transition state, as illustrated in FIG. 10*c*, the module 1004 is switched into a so-called bypass mode by the modules 1002 and 1003, with the result that despite an electrical connection between the modules 1002 and 1004 and 1004 and 1003, the module 1004 is, as it were, bypassed and no electrical current flows through. Only in the final state, as illustrated in FIG. 10*d*, can the module 1004 change from a bypass mode into an active operation.

FIG. 11 shows a schematic illustration of an embodiment of a meta module 1116 according to aspects of the invention in conjunction with further corresponding embodiments of meta modules 1114 and 1115 according to aspects of the invention, wherein the meta module 1115 is only partially illustrated, as is indicated by a dashed sinuous line. Each meta module 1114, 1115 and 1116 comprises here an associated traditional module 1113, 1117 and 1118 and switches 1102, 1103 and 1109, 1110 as well as electrical terminals 1119, 1101 and 1107, 1108 so that each meta module 1114, 1115 and 1116 permits the addition of a corresponding further module or meta module even during a respective operation. With each expansion by means of a meta module a new expansion possibility is produced. As already described in FIG. 7, the device can be generated equivalently for one or more than two connecting lines between two modules by correspondingly adding or removing terminals 1119, 1101 and 1107, 1108 and switches 1102, 1103 and 1109, 1110, respectively.

FIGS. 12*a*, 12*b* and 12*c* illustrate three examples of alternative arrangements of individual switches 1204 and 1205, and respectively 1214 and 1215, and respectively 1224, 1225, 1228 and 1229 and electrical terminals 1202, 1203, and respectively 1212, 1213, and respectively 1222, 1223, 1226 and 1227 in the respective meta modules. The latter, i.e. FIG. 12*c*, shows a meta module with two expansion plug-in locations for further modules or meta modules. Correspondingly, according to aspects of the invention, meta modules can also be configured with more than two expansion plug-in locations.

FIG. 13 shows an example of an alternative assignment of switches 1305, 1311 and electrical terminals 1303, 1304, and respectively 1306, 1307 to respective metal modules 1310, 1313.

For pure two-pole modules, as shown for example in FIG. 2, which share just one electrical connection with each of their neighbors, one switch and one terminal pair which include the switch is necessary for each module which can be optionally added later. For modules which share more than one contact with their immediate neighbors, a multiplicity of the abovementioned switches and associated terminal pairs is necessary per connection according to the number of necessary immediate electrical connections between two modules. FIG. 10 illustrates this for two immediate electrical connections between two modules.

The electrical terminal pairs can be implemented here in principle in any known way, for example plug-in contacts, screw contacts, terminal contacts, circuit board plug-in locations etc.

In the text which follows, the terminal pairs which are necessary for the addition of an individual module, that is to say for example one for two-pole modules and two for modules which each share two electrical connections with each of their neighbors, are combined under the term "plug-in location" or "expansion plug-in location" irrespective of a technical embodiment.

A number of modules which can be added during operation is defined by means of a number of available plug-in locations and associated switches. At the same time, defective modules which have been integrated into the system by means of such a plug-in location and associated switch can be removed during operation in order to be replaced by functionally capable modules.

While addition and removal of modules can generally serve mainly for the replacement of defective modules and the management of system redundancy in order to reduce the selection probability for conventional converters which have a specified and well defined peak power and peak voltage, in a number of applications a predefined expandability by keeping available a specific number of plug-in locations and associated switches is undesired. Instead, dynamic expansion beyond originally expected limits is desirable. A corresponding example may be considered to be a group of electrical energy sources, electrical energy stores and/or electrical energy consumers in a microgrid. If further electrical energy sources or energy stores are to be added, increasing energy consumption or in order to allow for increased fluctuations, this should generally not be unnecessarily restricted inadvertently by an original system.

According to aspects of the invention, the present invention accordingly proposes the meta modules shown, in particular, in FIGS. 11 and 12 which integrate within them electrical modules, expansion plug-in locations and associated switches which comprise these expansion plug-in locations. Each meta module also provides, by means of at least one expansion plug-in location and associated switch, the possibility of expanding the system with further modules or meta modules. Each added meta module, whether it is already originally in the system or is itself added by means of an expansion plug-in location, provides renewed expansion possibilities with a further expansion plug-in location.

Meta modules can be freely combined with modules which do not have any expansion plug-in locations. Accordingly, an overall system must merely contain a meta module in order to ensure that it can be expanded as desired. However, this expandability is dependent on the correct functioning of the one meta module. Accordingly, a system preferably contains a plurality of meta modules.

If a module or a meta module is added in one of the scenarios described above, it will preferably assume in the case of a connection a so-called active 0 state, in the modules shown in FIGS. 2 and 3 the terminals 207, 208 and 213, 214 and 219, 220 and 307, 309, 308, 310 and 317, 319, 318, 320 and 331, 333, 332, 334 are switched here, electrically connected in pairs, by means of the switches 203-206 and 211, 212 and 217, 218 and 303 to 306 and 313-316 and 323-330, or a passive state, i.e. all the switches are opened, with the result that diodes form a rectifier and prevent the buildup of a voltage by electrical elements in the module. Therefore, no active voltage which is unequal to 0 is present at the respective terminals of the further module or meta module, which voltage could have a hazardous effect during installation or could lead to losses as a result of discharging via a closed switch.

The respective switches which disconnect the lines between two modules and are kept available either at fixed plug-in locations or in meta modules according to aspects of the invention can be implemented very cost-effectively owing to the following properties:

a) a necessary switching speed is low and can also be ensured by mechanical switches. In addition, manual activation of the switches is possible.

b) All the switching processes can be carried out in a voltage-free fashion, even during operation. The additional module or modules associated with a respective switch can control a voltage via the switch and set it very precisely. Therefore, there is neither an arcing problem nor is there a high degree of wear at the corresponding switch.

c) A maximum voltage of a switch can be limited and arises as a result of the maximum voltage of the additional modules at this switch.

These properties follow the principle of Marquardt's modular multilevel converters which make high voltages controllable by using relatively favorable low voltage components.

A surge arrester, voltage suppressor etc. can be integrated in addition to the switches, in order to prevent damage to the switch in the case of an unexpected overvoltage.

Correspondingly, switches can be implemented as any desired known electrical switching devices, for example mechanical switches or semiconductor switches.

Opening and closing of the switch or switches can take place in a plurality of ways. The switches can be operated manually by a human operator. In this context, a safety mechanism can lock or release the switch. In addition, a switching can take place automatically if the presence of a further (meta) module in the system or a defect in a (meta) module is detected. This detection can take place by means of a sensor which detects the presence of a (meta) module connected to a plug-in location. This can be done, for example, in an optical, mechanical, electrical or capacitive way. In addition, the switching can be triggered by digital communication between the further (meta) module and a controller. For example, a further (meta) module can communicate its readiness to the controller via a status message. Alternatively, the controller can carry out functional diagnostics of the (meta) module or modules and control the switches on the basis thereof.

The closing of the switch or switches generally takes place as soon as a further (meta) module is added to the system, the electrical connection is brought about and either the controller is ready or a default state is generated in the (meta) module. The opening generally takes place before the removal of a module or meta module can start. When an embodiment of the plug-in switching device according to aspects of the invention is used, the necessary chronological sequence of the plugging and switching process is predefined automatically, with the result that dynamic integration of a (meta) module into an existing circuit can take place under load here.

FIGS. 4 and 5 show embodiments of the plug-in switching device according to aspects of the invention which integrates a respective switch with an associated plug-in location. Without an inserted plug of a further (meta) module, contacts of a switch which is associated with the plug-in location are closed. As soon as a plug of a further (meta) module is inserted, the contacts of the meta module 503, 505 firstly make contact with the two contacts of the switch 501, 502 before further insertion interrupts the direct contact of the switch or of the two first electrical lines 501, 502 and therefore ensures that there is a seamless and preferably voltage-free take up of the current by the further (meta) module. According to aspects of the invention, the two contacts of the switch or of the two first electrical lines of the embodiment of the device 501, 502 according to aspects of the invention are embodied as a spring mechanism which bring about a solid electrical contact with one another without the action of force. The upper termination of the contacts, characterized by 402 in FIG. 4, preferably forms a tapering depression or a receptacle part which is capable of receiving a plug with corresponding contacts of the further (meta) module and is able to push themselves apart from the latter owing to the tapering.

The diagrams in FIGS. 4 and 5 each merely illustrate an electrical connection between two adjacent modules, a terminal pair and an associated switch. For a plurality of electrical connections between two adjacent modules a plurality of terminal pairs and a plurality of associated switches must be implemented repeatedly in accordance with this arrangement.

FIGS. 14*a*-*d*, 15*a*-*d*, 16, 17*a*-*i*, and 18*a*-*e* each show further module types which can be configured as meta modules by also providing in each case at least one expansion plug-in location as described above and associated switches at the respective terminals, in order in this way to expand the respectively shown system with further modules or meta modules.

The at least one expansion plug-in location which is to be provided and which has at least one associated switch, if appropriate a plurality of associated switches, can be configured as an embodiment of the device according to aspects of the invention, which makes dynamic expandability during ongoing operation of the system possible.

What is claimed is:

1. A device for integrating at least one electrical element into an electrical circuit during ongoing operation of the electrical circuit, wherein the electrical circuit comprises at least two modules which are connected to one another via at least one electrical connection, the device comprising:

the at least one electrical connection including a connecting line to corresponding terminals of the at least two modules, wherein the connecting line comprises two first electrical lines which each lead to one of the at least two modules and are electrically connected to one another at at least a first contact point by a spring mechanism, a plug configured to disconnect the spring mechanism by insertion of the plug at the at least first contact point, the plug comprising at least two second electrical lines which form at least one electrical conductor and contact pair, and an insulating material lying between the contact pair, in such a way that the electrical contact between the two first electrical lines is released, but a respective electrical contact is produced at at least a second contact point between, in each case, one of the first electrical lines and one of the second electrical lines, wherein the plug is to be connected to the at least one electrical element to be integrated.

2. The device as claimed in claim 1, wherein the plug is configured for a plurality of electrical connections between, in each case, one of the two modules and the electrical element to be integrated, and for this purpose has a corresponding multiplicity of electrical conductor and contact pairs, wherein respective partners of a respective pair are arranged opposite one another and are separated by the at least one insulating material.

3. The device as claimed in claim 2, wherein the electrical insulating material is extended to intermediate spaces between the multiplicity of electrical conductor and contact pairs, as a result of which the plug has at least one smooth surface.

4. The device as claimed in claim 1, in which the at least one conductor and contact pair lies countersunk with respect to the insulating material, and as a result corresponding grooves are formed on the surface of the plug.

5. The device as claimed in claim 1, in which a rounded portion is provided at one end of the at least one conductor and contact pair located in direction of insertion of the plug, which rounded portion is configured in such a way that when the plug is inserted into the spring mechanism the two second lines of the at least one conductor and contact pair firstly each make electrical contact with in each case one of the two receiving first lines before the electrical contact between the two first lines is disconnected by further insertion of the plug.

6. The device as claimed in claim 1, in which the plug has cutouts running on at least one side in the direction of insertion of the plug.

7. The device as claimed in claim 1, in which, starting from an inserted state of the plug into the spring mechanism the two first lines of the at least one connecting line are lengthened in a direction pointing away from the respective module and from the at least one second contact point and starting from the at least one second contact point they slowly extend away from one another in the direction of their respective ends in such a way that when the plug is pulled out respective contacts of the at least two second lines at the at least one second contact point are electrically disconnected from the two first lines only when the two first lines of the at least one connecting line are in contact again at the at least one first contact point.

8. The device as claimed in claim 1, wherein the device further comprises:
at least one receptacle part with at least one opening configured to receive the plug when it is inserted into the spring mechanism as far as a first position without interrupting the electrical connection of the two first electrical lines at the first contact point,
at least one mechanical opening unit which is in operative contact with the first contact point, with the result that when the plug is inserted further beyond the first position into the receptacle part the electrical connection at the first contact point is opened counter to a force of the spring mechanism.

9. A meta module comprising:
an electrical element, at least a first terminal, at least a second terminal; and
the device of claim 1, connecting line of the device connected to the second terminal, the device implemented with the two first electrical lines of the device, wherein one of the two first electrical lines is connected to the electrical element and the other of the two first electrical lines leads to a third terminal configured to connect a further electrical element or a further module, and wherein the two first electrical lines of the device are electrically connected to one another at at least a first contact point the spring mechanism of the device, wherein the spring mechanism is disconnected by completely inserting the plug of the device, wherein the plug is configured to be connected to a further electrical element or a further module.

10. A meta module comprising:
an electrical element;
at least a first terminal;
at least a second terminal; and
a the device of claim 1 connected to the second terminal.

11. A method for integrating at least one electrical element into an electrical circuit during ongoing operation of the electrical circuit, wherein the electrical circuit comprises at least two modules which are connected to one another via at least one electrical connection, and the at least one electrical connection is implemented by a connecting line and corresponding terminals of the modules for the connecting line, wherein the connecting line comprises two first electrical lines which each lead to one of the two modules and are electrically connected to one another at at least a first contact point by means of a spring mechanism, the method comprising:
the spring mechanism, the spring mechanism comprising at least two second electrical lines which form a line and contact pair, and an insulating material lying between the contact pair, in such a way that the electrical contact between the two first electrical lines is released, but a respective electrical contact is produced at at least a second contact point between, in each case, one of the first electrical lines and one of the second electrical lines, wherein the plug is connected to the at least one electrical element to be integrated.

12. A method for integrating at least one electrical element into an electrical circuit during ongoing operation of the electrical circuit, wherein the electrical circuit comprises at least two modules which are connected to one another via at least one electrical connection, the method comprising:
using the device as claimed of claim 1 to integrate the at least one electrical element into the electrical circuit.

* * * * *